(12) United States Patent
Park et al.

(10) Patent No.: US 9,276,654 B2
(45) Date of Patent: Mar. 1, 2016

(54) TRANSMITTER AND SIGNAL TRANSMITTING METHOD THEREOF

(71) Applicant: SAMSUNG ELECTRONICS CO., LTD., Suwon-si (KR)

(72) Inventors: Joo-sung Park, Suwon-si (KR); Jung-Il Han, Seongnam-si (KR); Jung-Hyun Park, Hwaseong-si (KR); Jung-pil Yu, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/324,665

(22) Filed: Jul. 7, 2014

(65) Prior Publication Data
US 2015/0010104 A1    Jan. 8, 2015

Related U.S. Application Data

(60) Provisional application No. 61/843,148, filed on Jul. 5, 2013, provisional application No. 61/870,416, filed on Aug. 27, 2013, provisional application No. 61/878,232, filed on Sep. 16, 2013.

(30) Foreign Application Priority Data

Jun. 19, 2014   (KR) .................... 10-2014-0075128

(51) Int. Cl.
*H04B 7/04*      (2006.01)
*H04L 27/26*     (2006.01)
(Continued)

(52) U.S. Cl.
CPC ............ *H04B 7/0456* (2013.01); *H04L 1/0625* (2013.01); *H04L 27/2627* (2013.01); *H04W 72/0473* (2013.01)

(58) Field of Classification Search
CPC ............ H04B 7/00; H04B 7/02; H04B 7/022; H04B 7/024; H04B 7/026; H04B 7/04; H04B 7/0404; H04B 7/0408; H04B 7/0413

USPC .......... 375/259, 260, 267, 295, 299, 258, 296
See application file for complete search history.

(56) References Cited

U.S. PATENT DOCUMENTS 7,729,232 B2 * 6/2010 Wang et al. ................... 370/203
8,374,257 B2 * 2/2013 Khan et al. .................... 375/260
(Continued)

FOREIGN PATENT DOCUMENTS

| EP | 2 538 604 A2 | 12/2012 |
| WO | 2010004586 A2 | 1/2010 |
| WO | 2012146739 A1 | 11/2012 |

OTHER PUBLICATIONS

Lin et al., "X-Structured Precoder Design for Spatial Multiplexing MIMO Systems", Global Communications Conference, IEEE, Dec. 3, 2012, 6 pages.

(Continued)

*Primary Examiner* — Siu Lee
(74) *Attorney, Agent, or Firm* — Sughrue Mion, PLLC

(57) ABSTRACT

A signal transmitter and receiver are provided. The transmitter includes: a Multiple Input Multiple Output (MIMO) precoder configured to, in response to a first input signal and a second input signal, generate a first transmission signal and a second transmission signal by performing MIMO precoding by pre-phase shifting or pre-phase shifting/hopping the second input signal, and superposition encoding the first input signal and the pre-phase shifted or pre-phase shifted/hopped second input signal; and an Orthogonal Frequency Division Multiplexing (OFDM) modulator configured to OFDM modulate the first transmission signal and the second transmission signal.

20 Claims, 12 Drawing Sheets

(51) Int. Cl.
*H04W 72/04* (2009.01)
*H04L 1/06* (2006.01)

(56) References Cited

U.S. PATENT DOCUMENTS

| | | | |
|---|---|---|---|
| 2005/0111376 A1* | 5/2005 | Raghothaman et al. | 370/252 |
| 2007/0270170 A1* | 11/2007 | Yoon et al. | 455/509 |
| 2007/0286238 A1* | 12/2007 | Wang et al. | 370/478 |
| 2007/0291867 A1 | 12/2007 | Khan et al. | |
| 2011/0075758 A1* | 3/2011 | Nam et al. | 375/295 |
| 2011/0110405 A1 | 5/2011 | Lee et al. | |
| 2011/0222462 A1* | 9/2011 | Ho et al. | 370/312 |
| 2011/0228878 A1 | 9/2011 | Sorrentino | |
| 2012/0207241 A1* | 8/2012 | Wang et al. | 375/295 |

OTHER PUBLICATIONS

Communication, Issued by the European Patent Office, Dated Jan. 21, 2015, in counterpart European Application No. 14175883.9.

Communication, Issued by the International Searching Authority, Dated Oct. 31, 2014, in counterpart International Application No. PCT/KR2014/006014.

Communication dated Oct. 8, 2015 issued by the European Patent Office in counterpart European Patent Application No. 14175883.9.

\* cited by examiner

TRANSMITTER AND SIGNAL TRANSMITTING METHOD THEREOF

CROSS-REFERENCE TO RELATED APPLICATIONS

This application claims priorities from U.S. Provisional Application No. 61/843,148 filed on Jul. 5, 2013, U.S. Provisional Application No. 61/870,416 filed on Aug. 27, 2013, and U.S. Provisional Application No. 61/878,232 field on Sep. 16, 2013, in the United States Patent and Trademark Office, and Korean Patent Application No. 10-2014-0075128, filed on Jun. 19, 2014, the disclosures of which are incorporated herein by reference in their entirety.

TECHNICAL FIELD

Apparatuses and methods consistent with exemplary embodiments relate to a transmitter, a receiver, and a signal exchanging method thereof, and more particularly, to a transmitter and a receiver which exchange signals with each other in a Multiple Input Multiple Output (MIMO) method, and a signal exchanging method thereof.

BACKGROUND

In the 21st century information-oriented society, broadcasting communication services are moving into an era of digitalization, multi-channel, wideband, and high quality. In particular, as high quality digital televisions and portable multimedia player (PMP) and portable broadcasting equipment are increasingly used in recent years, there is an increasing demand for methods for supporting various transmitting and receiving methods of digital broadcasting services.

In order to meet such a demand, broadcasting communication-related technology organizations and industries have developed advanced technologies and are providing a variety of services to satisfy users' needs. In particular, MIMO transmitting and receiving methods for increasing transmission efficiency using limited frequency resources are being actively studied. Therefore, there is a demand for a method for providing users with improved services with high performance.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a transmitter which generates a transmission signal in a MIMO precoding method which pre-phase shifts or pre-phase shifts/hops one of input signals and superposes it onto the other input signals, and transmits the transmission signal, a receiver which receives and processes the signal, and a signal exchanging method thereof.

One or more exemplary embodiments also provide a transmitter which generates a transmission signal in a MIMO precoding method which pre-phase shifts or pre-phase shifts/hops one of input signals, superposes it onto the other input signals, and post-phase hops the signals, and transmits the transmission signal, a receiver which receives and process the signal, and a signal exchanging method thereof According to an aspect of an exemplary embodiment, there is provided a transmitter which may include: a MIMO precoder configured to, in response to a first input signal and a second input signal, generate a first transmission signal and a second transmission signal by performing MIMO precoding by pre-phase shifting or pre-phase shifting/hopping the second input signal, and superposition encoding the first input signal and the pre-phase shifted or pre-phase shifted/hopped second input signal; and an Orthogonal Frequency Division Multiplexing (OFDM) modulator configured to OFDM modulate the first transmission signal and the second transmission signal.

The MIMO precoder may perform the MIMO precoding by using Equation 1 presented below.

The MIMO precoder may perform the MIMO precoding by using Equation 2 presented below.

The MIMO precoder may perform the MIMO precoding by using Equation 3 presented below.

The MIMO precoder may perform the MIMO precoding by using Equation 4 presented below.

The MIMO precoder may perform the MIMO precoding by additionally post-phase shifting or post-phase hopping after superposition encoding the first input signal and the pre-phase shifted or pre-phase shifted/hopped second input signal.

The MIMO precoder may perform the MIMO precoding by using Equation 5 presented below.

The MIMO precoder may perform the MIMO precoding by using Equation 6 presented below.

The MIMO precoder may perform the MIMO precoding by using Equation 7 presented below.

The MIMO precoder may perform the MIMO precoding by allocating different power to the first input signal and the second input signal prior to pre-phase shifting or pre-phase shifting/hopping the second input signal.

The MIMO precoder may perform the MIMO precoding by using Equation 8 presented below.

According to an aspect of another exemplary embodiment, there is provided a method for transmitting of a transmitter. The method may include: in response to a first input signal and a second input signal, generating a first transmission signal and a second transmission signal by performing MIMO precoding by pre-phase shifting or pre-phase shifting/hopping the second input signal and superposition encoding the first input signal and the pre-phase shifted or pre-phase shifted/hopped second input signal; and OFDM modulating the first transmission signal and the second transmission signal. 17.

The generating may include performing the MIMO precoding by using Equation 1 presented below.

The generating may include performing the MIMO precoding by using Equation 2 presented below.

The generating may include performing the MIMO precoding by using Equation 3 presented below.

The generating may include performing the MIMO precoding by using Equation 4 presented below.

The generating may include performing the MIMO precoding by additionally post-phase shifting or post-phase hopping after superposition encoding the first input signal and the pre-phase shifted or pre-phase shifted/hopped second input signal.

The generating may include performing the MIMO precoding by using Equation 5 presented below.

The generating may include performing the MIMO precoding by using Equation 6 presented below.

The generating may include performing the MIMO precoding by using Equation 7 presented below.

The generating may include performing the MIMO precoding by allocating different power to the first input signal and the second input signal prior to pre-phase shifting or pre-phase shifting/hopping the second input signal.

The generating may include performing the MIMO precoding by using Equation 8 presented below.

According to various exemplary embodiments as described above, a transmit diversity can increase in the MIMO spatial multiplexing method, and bit-error-rate (BER) performance can be improved.

BRIEF DESCRIPTION OF THE DRAWINGS

The above and/or other aspects will be more apparent by describing in detail exemplary embodiments, with reference to the accompanying drawings, in which.

DETAILED DESCRIPTIONS OF THE EXEMPLARY EMBODIMENTS

Figure 1:
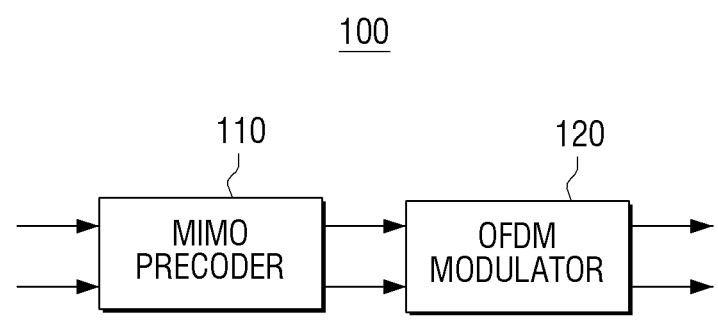
FIG. 1 is a block diagram to illustrate a configuration of a transmitter according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a transmitter according to an exemplary embodiment. Referring to FIG. 1, the transmitter 100 includes a Multiple Input Multiple Output (MIMO) pre-coder 110 and an Orthogonal Frequency Division Multiplexing (OFDM) modulator 120.

The MIMO pre-coder 110 generates a first transmission signal and a second transmission signal by MIMO pre-coding a first input signal and a second input signal.

In this case, the first input signal and the second input signal which are input to the MIMO precoder 110 may be modulation symbols. That is, after bits to be transmitted to a receiver (not shown) are modulated in various modulation methods such as 4-Qaudrature Amplitude Modulation (QAM), 16-QAM (or 16-NUC), 64-QAM (or 64-NUC), 256-QAM (or 256-NUC), 1024-QAM (or 1024-NUC), 4096-QAM (or 4096-NUC), etc., the QAM symbols are demultiplexed into two input signals, and the two input signals are input to the MIMO pre-coder 110 in sequence. In this case, a uniform constellation (UC) or a non-uniform constellation (NUC) may be used as a QAM constellation. Herein, the QAM having the non-uniform constellation is referred to as NUC. Accordingly, the MIMO pre-coder 110 performs MIMO pre-coding on a symbol basis to generate the first transmission signal and the second transmission signal for MIMO transmission.

The method of MIMO precoding the first input signal and the second input signal at the MIMO pre-coder 110 will be explained in detail below.

The OFDM modulator 120 OFDM modulates the first transmission signal and the second transmission signal.

Specifically, the OFDM modulator 120 OFDM modulates the first transmission signal and the second transmission signal to map them onto an OFDM frame. That is, the OFDM modulator 120 may perform OFDM modulation by mapping pre-coded symbols of the first transmission signal and pre-coded symbols of the second transmission signal onto sub-carriers of different OFDM frames.

Herein, the OFDM frames may be transmitted to the receiver (not shown) in the MIMO method. For example, an OFDM frame which is generated by OFDM modulating the first transmission signal may be transmitted to the receiver (not shown) via a first transmission antenna (not shown), and an OFDM frame which is generated by OFDM modulating the second transmission signal may be transmitted to the receiver (not shown) via a second transmission antenna (not shown).

Hereinafter, the method of MIMO precoding at the MIMO pre-coder 110 will be explained in detail.

Specifically, in response to the first input signal and the second input signal, the MIMO pre-coder 110 may perform MIMO pre-coding by pre-phase shifting or pre-phase shifting/hopping the second input signal, and superposition encoding the first input signal and the pre-phase shifted or pre-phase shifted/hopped second input signal.

The pre-phase shifting refers to shifting a phase of a QAM symbol, which is an input signal having a complex number value, by a predetermined value. For example, when a pre-phase shift parameter θ is π/7, the phase of the QAM symbol is shifted by π/7 by pre-phase shifting.

The pre-phase shifting/hopping refers to shifting the phase of the QAM symbol by a predetermined value and hopping (or rotating) the phase of the QAM symbol by a predetermined value in sequence according to a symbol index. For example, when a pre-phase shift/hopping parameter θ(k) is π/7+k×π/2, the phase of the QAM symbol may be shifted by π/7 and hopped by π/2 in sequence according to the symbol index k by pre-phase shifting/hopping. As a result, the phase of the QAM symbol may be shifted by π/7+k×π/2 according to the symbol index k.

Hereinafter, the method of MIMO precoding at the MIMO pre-coder 110 according to various exemplary embodiments will be explained in detail. The pre-phase shifting or pre-phase shifting/hopping may be applied to one of the first input signal and the second input signal. However, hereinafter, it is assumed that the second input signal among the first input signal and the second input signal is pre-phase shifted or pre-phase shifted/hopped for convenience of explanation.

For example, the MIMO pre-coder 110 may perform MIMO pre-coding by using Equation 1 presented below:

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta} \end{bmatrix} \begin{bmatrix} c_1(k) \\ c_2(k) \end{bmatrix}, \quad (1)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift matrix, $$\begin{bmatrix} \cos\psi & \sin\psi \\ \sin\psi & -\cos\psi \end{bmatrix}$$

is an superposition encoding matrix, $\theta$ is a pre-phase shift parameter, and $\psi$ is a superposition encoding parameter.

In the above Equation (1), k is an index of a symbol constituting each input signal. Since the symbols precoded by the MIMO precoder 110 are mapped onto OFDM frames by the OFDM modulator 120, k may be a sub-carrier index of the OFDM frame, and k has the same meaning in the exemplary embodiments presented below. Herein, each sub-carrier constitutes an OFDM cell and thus, when the number of OFDM cells is '$N_{cell}$', k=0, 1, . . . , $N_{cell}/2-1$.

Referring to Equation 1, the MIMO precoder 110 may pre-phase shift the input signals by multiplying the input signals by the pre-phase shift matrix. That is, the MIMO precoder 110 multiples the first input signal $c_1(k)$ and the second input signal $c_2(k)$ by $$\begin{bmatrix} 1 & 0 \\ 0 & e^{j\theta} \end{bmatrix},$$

thereby generating the second input signal $e^{j\theta} \times c_2(k)$ the phase of which is shifted by $\theta$.

The MIMO precoder 110 may generate the first transmission signal and the second transmission signal by performing superposition encoding with respect to the first input signal and the pre-phase shifted second input signal. The superposition encoding is performed by multiplying the first input signal and the pre-phase shifted second input signal by the superposition encoding matrix. That is, the MIMO precoder 110 may generate the first transmission signal $x_1(k)=\cos\psi \times c_1(k)+e^{j\theta}\times\sin\psi\times c_2(k)$ and the second transmission signal $x_2(k)=\sin\psi \times c_1(k)-e^{j\theta}\times\cos\psi\times c_2(k)$ by multiplying the first input signal $c_1(k)$ and the pre-phase shifted second input signal $e^{j\theta}\times c_2(k)$ by $$\begin{bmatrix} \cos\psi & \sin\psi \\ \sin\psi & -\cos\psi \end{bmatrix}.$$

Figure 2:
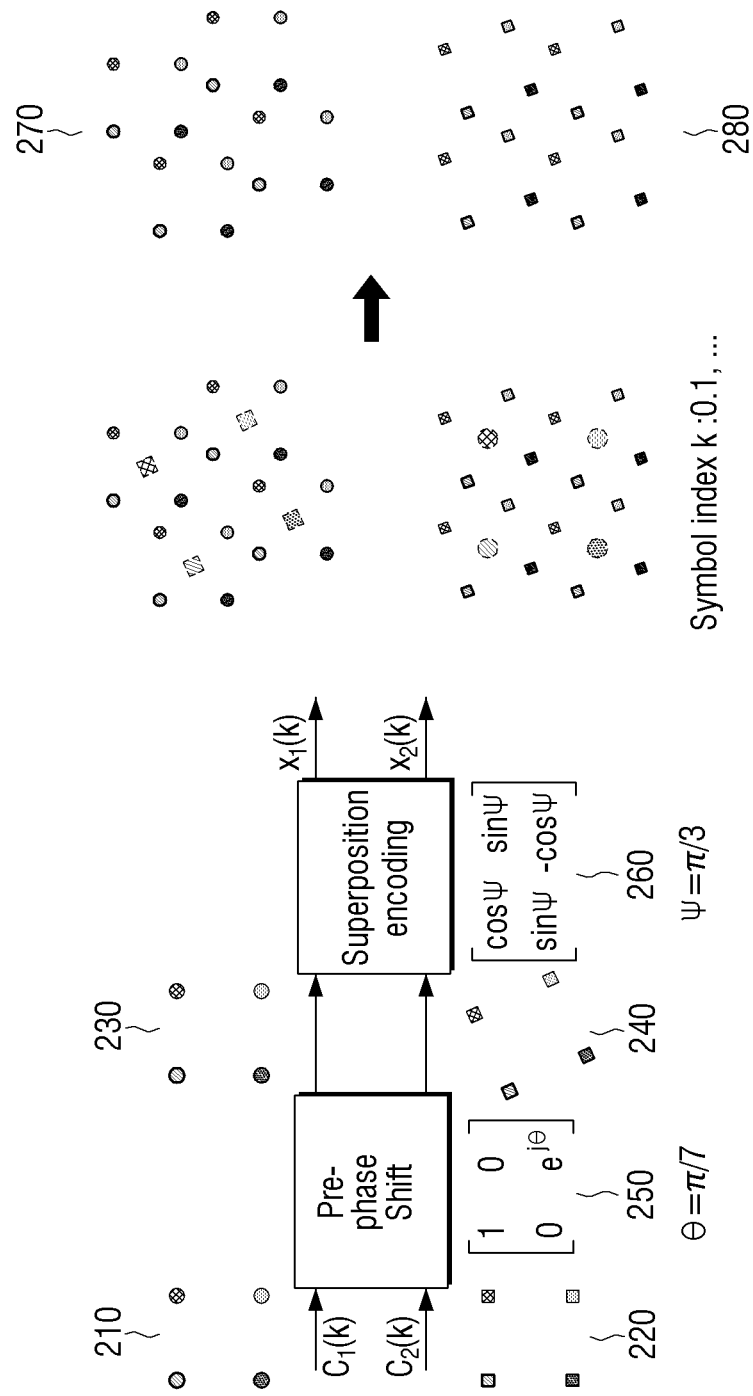
FIGS. 2 to 8 are views to illustrate a MIMO precoding method according to various exemplary embodiments.

Hereinafter, a method for MIMO precoding when $\theta=\pi/7$ and $\psi=\pi/3$ will be explained by way of an example with reference to FIG. 2. In FIG. 2, it is assumed that 4-QAM symbols are input to the MIMO precoder 110 in sequence in pair, and constitute the first input signal $c_1(k)$ and the second input signal $c_2(k)$. Accordingly, constellations of the first input signal $c_1(k)$ and the second input signal $c_2(k)$ are expressed as a constellation 210 and a constellation 220, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift matrix 250 and a superposition encoding matrix 260 in sequence.

Specifically, when the first input signal $c_1(k)$ and the second input signal $c_2(k)$ are multiplied by the pre-phase shift matrix 250, the phase of the first input signal $c_1(k)$ is not changed but the phase of the second input signal $c_2(k)$ is pre-phase shifted by $\pi/7$. Accordingly, after the first input signal $c_1(k)$ and the second input signal $c_2(k)$ are multiplied by the pre-phase shift matrix 250, the constellation of the second input signal $c_2(k)$ is changed to a constellation 240 and the constellation of the first input signal $c_1(k)$ remains the same.

In addition, when the first input signal $c_1(k)$ and the second input signal $e^{j(\pi/7)}\times c_2(k)$ which is pre-phase shifted by $\pi/7$ are multiplied by the superposition encoding matrix 260, the first transmission signal $x_1(k)=\cos\pi/3\times c_1(k)+e^{j(\pi/7)}\times\sin\pi/3\times c_2(k)$ and the second transmission signal $x_2(k)=\sin\pi/3\times c_1(k)-e^{j(\pi/7)}\times\cos\pi/3\times c_2(k)$ are generated.

Accordingly, the constellation of the first transmission signal $x_1(k)$ may be expressed as constellation points at which $c_1(k)$ having small power of $\cos\pi/3$ is superposed with reference to $e^{j(\pi/7)}\times c_2(k)$ having great power of $\sin\pi/3$. Therefore, the constellation of the first transmission signal $x_1(k)$ is expressed as a constellation 270. The constellation of the second transmission signal $x_2(k)$ may be expressed as constellation points at which $e^{j(\pi/7)}\times c_2(k)$ having small power of $\cos\pi/3$ is superposed with reference to $c_1(k)$ having great power of $\sin\pi/3$. Therefore, the constellation of the second transmission signal $x_2(k)$ is expressed as a constellation 280.

In the constellation 270 of FIG. 2, a solid-line white circle ○ corresponds to a constellation point of a precoded transmission symbol of the first transmission signal $x_1(k)$, and, in the constellation 280 of FIG. 2, a solid-line white square □ corresponds to a constellation point of a precoded transmission symbol of the second transmission signal $x_2(k)$. Since the constellation point of each transmission signal is determined by a combination of the 4-QAM first input signal $c_1(k)$ and the 4-QAM second input signal $c_2(k)$ (that is, is mapped onto the combination) as described above, the first transmission signal $x_1(k)$ and the second transmission signal $x_2(k)$ each have 16(=4×4) constellation points.

As described above, the first transmission signal $x_1(k)$ and the second transmission signal $x_2(k)$ each are constituted by a combination of the first input signal $c_1(k)$ and the second input signal $c_2(k)$, and are transmitted to a receiver (not shown) via different antennas according to a MIMO method. In view of this, the transmission capacity can increase.

In addition, since the second input signal $c_2(k)$ is pre-phase shifted and then is superposition encoded along with the first input signal $c^1(k)$, the constellations 270 and 280 of the transmission signals $x_1(k)$ and $x_2(k)$ are spherical constellations. That is, since the constellations 270 and 280 of the transmission signals $x_1(k)$ and $x_2(k)$ are changed to Gaussian forms, a peak-symbol energy can be reduced in comparison with that before the pre-phase shift is applied, and the transmit diversity at a shaping gain and a fading channel increases, and thus, bit-error-rate (BER) performance can be improved.

In FIG. 2, $\theta=\pi/7$ and $\psi=\pi/3$. However, this is merely an example, and $\theta$ and $\psi$ are variable.

In another example, the MIMO precoder 110 may perform MIMO precoding by using Equation 2 presented below:

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta} \end{bmatrix} \begin{bmatrix} c_1(k) \\ c_2(k) \end{bmatrix}, \quad (2)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift/hopping matrix, $$\begin{bmatrix} \cos\psi & \sin\psi \\ \sin\psi & -\cos\psi \end{bmatrix}$$

is a superposition coding matrix, $\theta(k)$ is a pre-phase shift/hopping parameter for a $k^{th}$ symbol, and $\psi$ is a superposition encoding parameter.

As described above, the pre-phase shifting/hopping refers to performing pre-phase shifting and pre-phase hopping simultaneously, and the pre-phase hopping refers to rotating a phase of each symbol by a predetermined value in sequence according to a symbol index. Accordingly, the pre-phase shift/hopping parameter $\theta(k)$ is a function of a symbol index k, which is different from Equation 1.

Figure 3:
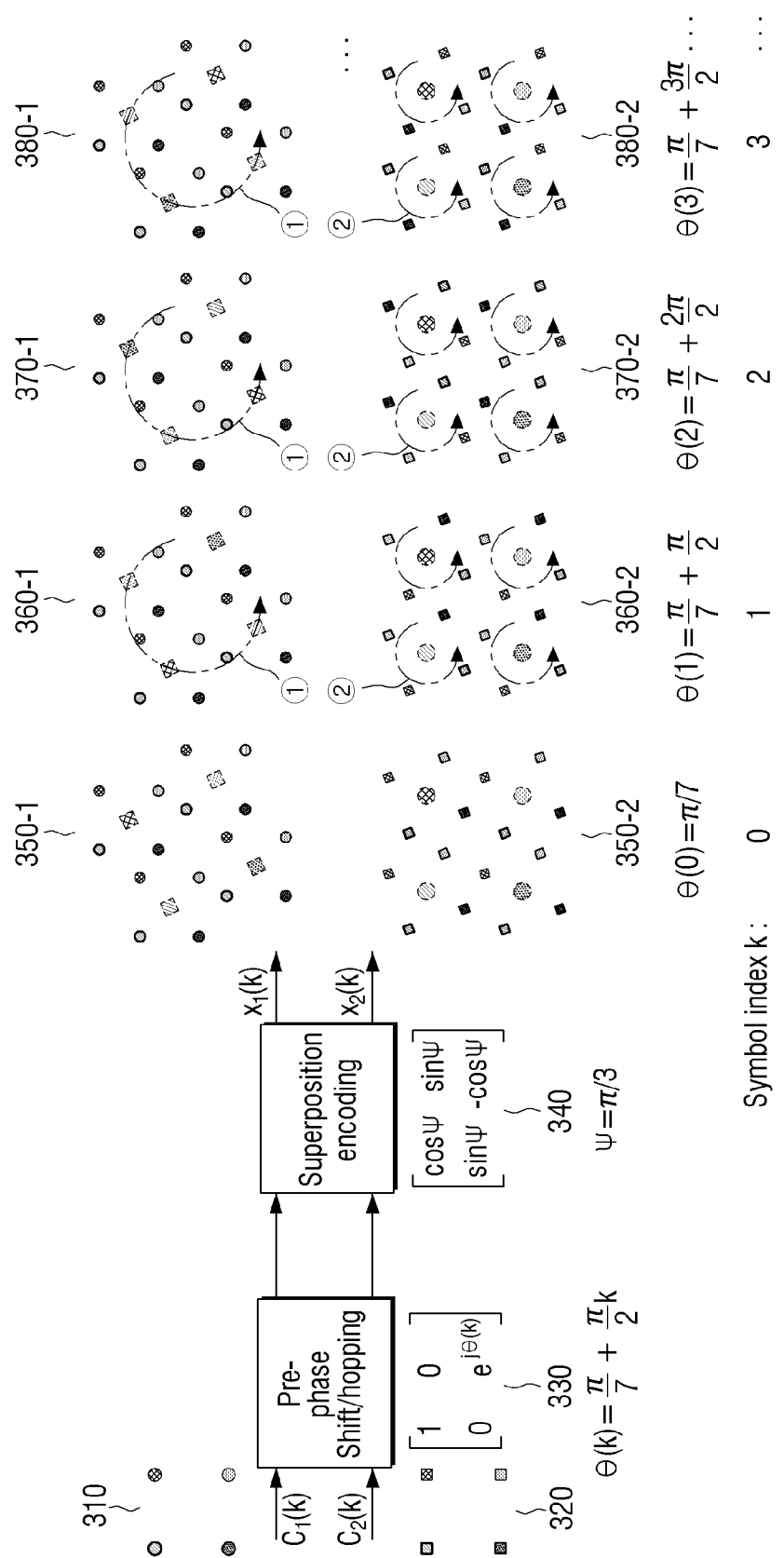

Hereinafter, a method for generating transmission signals by MIMO precoding when $\theta(k)=\pi/7+k\times\pi/2$ and $\psi=\pi/3$ will be explained with reference to FIG. 3. In FIG. 3, it is assumed that 4-QAM symbols are input to the MIMO precoder 110 in sequence in pair, and constitute the first input signal $c_1(k)$ and the second input signal $c_2(k)$. Accordingly, the constellations of the first input signal $c_1(k)$ and the second input signal $c_2(k)$ are expressed as a constellation 310 and a constellation 320, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift/hopping matrix 330 and a superposition encoding matrix 340 in sequence.

Specifically, when the first input signal $c_1(k)$ and the second input signal $c_2(k)$ are multiplied by the pre-phase shift/hopping matrix 330, the phase of the first input signal $c_1(k)$ is not changed but the phase of the second input signal $c_2(k)$ is pre-phase shifted by $\pi/7$ and pre-phase hopped by $\pi/2$ according to the symbol index k.

That is, when k=4n (n=0, 1, . . . ), the $4n^{th}$ symbol $c_2(4n)$ of the second input signal is pre-phase shifted/hopped by $\pi/7$, when k=4n+1 (n=0, 1, . . . ), the $(4n+1)^{th}$ symbol $c_2(4n+1)$ of the second input signal is pre-phase shifted/hopped by $\pi/7+\pi/2$, when k=4n+2 (n=0, 1, . . . ), the $(4n+2)^{th}$ symbol $c_2(4n+2)$ of the second input signal is pre-phase shifted/hopped by $\pi/7+2\times\pi/2$, and, when k=4n+3 (n=0, 1, . . . ), the $(4n+3)^{th}$ symbol $c_2(4n+3)$ of the second input signal is pre-phase shifted/hopped by $\pi/7+3\times\pi/2$.

In addition, when the first input signal $c_1(k)$ and the second input signal $e^{j(\pi/7+k\times\pi/2)}\times c_2(k)$ which is pre-phase shifted/hopped by $\pi/7+k\times\pi/2$ are multiplied by the superposition encoding matrix 340, the first transmission signal $x_1(k)=\cos$ $\pi/3\times c_1(k)+e^{j(\pi/7+k\times\pi/2)}\times\sin \pi/3\times c_2(k)$ and the second transmission signal $x_2(k)=\sin \pi/3\times c_1(k)-e^{j(\pi/7+k\times\pi/2)}\times\cos \pi/3\times c_2(k)$ are generated.

Since the phase of the second input signal $c_2(k)$ is pre-phase hopped by a predetermined value in sequence according to the symbol index k as described above, the constellations of the transmission signals $x_1(k)$ and the $x_2(k)$ may vary according to the symbol index k.

Specifically, when k=4n (n=0, 1, . . . ), the $4n^{th}$ symbol $c_2(4n)$ of the second input signal is pre-phase shifted/hopped by $\pi/7$. Thus, the constellation of the first transmission signal $x_1(k)$ is expressed as a constellation 350-1 and the constellation of the second transmission signal $x_2(k)$ is expressed as a constellation 350-2. In addition, when k=4n+1 (n=0, 1, . . . ), the $(4n+1)^{th}$ symbol $c_2(4n+1)$ of the second input signal is pre-phase shifted/hopped by $\pi/7+\pi/2$. Thus, the constellation of the first transmission signal $x_1(k)$ is expressed as a constellation 360-1 and the constellation of the second transmission signal $x_2(k)$ is expressed as a constellation 360-2. In addition, when k=4n+2 (n=0, 1, . . . ), the $(4n+2)^{th}$ symbol $c_2(4n+2)$ of the second input signal is pre-phase shifted/hopped by $\pi/7+2\times\pi/2$. Thus, the constellation of the first transmission signal $x_1(k)$ is expressed as a constellation 370-1 and the constellation of the second transmission signal $x_2(k)$ is expressed as a constellation 370-2. In addition, when k=4n+3 (n=0, 1, . . . ), the $(4n+3)^{th}$ symbol $c_2(4n+3)$ of the second input signal is pre-phase shifted/hopped by $\pi/7+3\times\pi/2$. Thus, the constellation of the first transmission signal $x_1(k)$ is expressed as a constellation 380-1 and the constellation of the second transmission signal $x_2(k)$ is expressed as a constellation 380-2.

In the constellations 350-1 to 380-1 of FIG. 3, a solid-line white circle ○ corresponds to a constellation point of a pre-coded symbol of the first transmission signal $x_1(k)$, and, in the constellations 350-2 to 380-2, a solid-line white square □ corresponds to a constellation point of a precoded symbol of the second transmission signal $x_2(k)$. Since the constellation point of each transmission signal is determined by a combination of the 4-QAM first input signal $c_1(k)$ and the 4-QAM second input signal $c_2(k)$ as described above, the first transmission signal $x_1(k)$ and the second transmission signal $x_2(k)$ each have 16(=4×4) constellation points.

Referring to FIG. 3, since the phase of the transmission signal is pre-phase hopped by $\pi/2$ in sequence according to the symbol index, the constellations of the transmission signals are rotated according to the symbol index as indicated by ① and ②. That is, since bit-to-symbol mapping is changed according to the symbol index, the transmit diversity increases in comparison with the case of FIG. 2.

However, since the size of the phase which is pre-phase hopped in sequence according to the symbol index is $\pi/2$, the symbol mapping on the constellations 350-1 to 380-2 of the transmission signals of the case of FIG. 3 varies with time, but the constellations may maintain their spherical shapes constantly. Accordingly, the peak-symbol energy can be reduced in comparison with that before the pre-phase shift/hopping is applied and the transmit diversity increases and thus BER performance can be improved.

In FIG. 3, $\theta(k)=\pi/7+k\times\pi/2$ and $\psi=\pi/3$. However, this is merely an example, and $\theta(k)$ and $\psi$ are variable.

In another example, the MIMO precoder 110 may perform MIMO precoding by using Equation 3 presented below:

$$\begin{bmatrix} x_1(k) \\ x_2(k) \end{bmatrix} = \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta} \end{bmatrix} \begin{bmatrix} c_1(k) \\ c_2(k) \end{bmatrix}, \quad (3)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift matrix, $$\begin{bmatrix} \cos\psi(k) & \sin\psi(k) \\ \sin\psi(k) & -\cos\psi(k) \end{bmatrix}$$

is a superposition encoding matrix, $\theta$ is a pre-phase shift parameter, and $\psi(k)$ is a superposition encoding parameter for a $k^{th}$ symbol.

Referring to Equation 3, since the superposition encoding parameter $\psi(k)$ is a function of the symbol index k, the superposition encoding parameter $\psi(k)$ varies according to the symbol index k. That is, Equation 3 differs from Equation 1 in that the size and sign (positive/negative) of the first input signal and the second input signal which constitute the first transmission signal and the second transmission signal vary according to the symbol index k.

Figure 4:
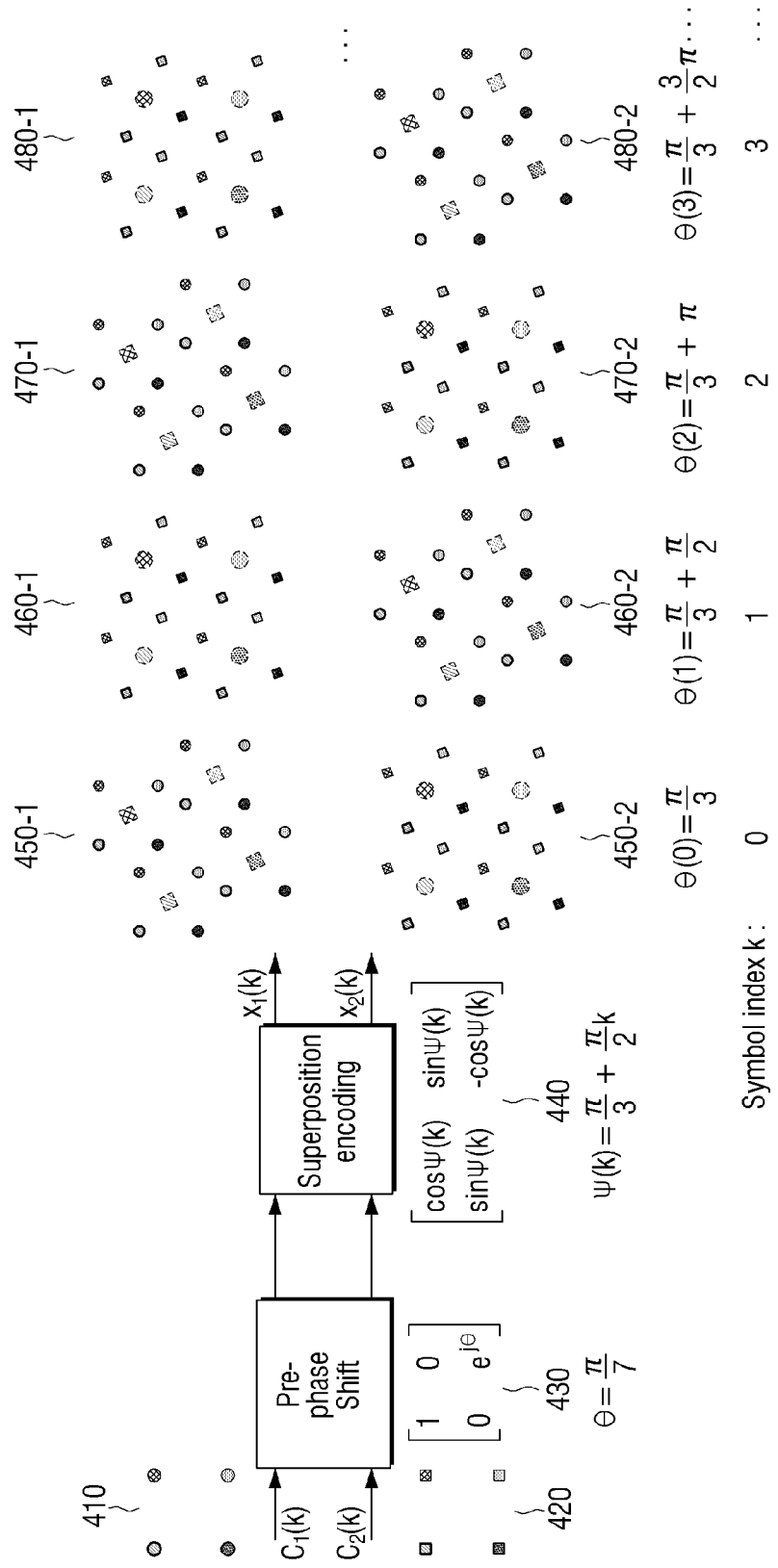

Hereinafter, a method for generating transmission signals by MIMO precoding when $\theta=\pi/7$ and $\psi(k)=\pi/3+k\times\pi/2$ will be explained with reference to FIG. 4. In FIG. 4, it is assumed that 4-QAM symbols are input to the MIMO precoder 110 in sequence in pair, and constitute the first input signal $c_1(k)$ and the second input signal $c_2(k)$. Accordingly, the constellations of the first input signal $c_1(k)$ and the second input signal $c_2(k)$ are expressed as a constellation 410 and a constellation 420, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift matrix 430 and a superposition encoding matrix 440 in sequence.

Specifically, when the first input signal $c_1(k)$ and the second input signal $c_2(k)$ are multiplied by the pre-phase shift matrix 430, the phase of the first input signal $c_1(k)$ is not changed but the phase of the second input signal $c_2(k)$ is pre-phase shifted by $\pi/7$.

In addition, when the first input signal $c_1(k)$ and the second input signal $e^{j(\pi/7)} \times c_2(k)$ which is pre-phase shifted by $\pi/7$ are multiplied by the superposition encoding matrix 440, the first transmission signal $x_1(k)=\cos(\pi/3+k\times\pi/2)\times c_1(k)+e^{j(\pi/7)}\times \sin(\pi/3+k\times/2)\times c_2(k)$ and the second transmission signal $x_2(k)=\sin(\pi/3+k\times\pi/2)\times c_1(k)-e^{j(\pi/7)}\times\cos(\pi/3k\times\pi/2)\times c_2(k)$ are generated.

In this case, since the superposition encoding parameter $v(k)$ varies according to the symbol index k, the constellations of the transmission signals $x_1(k)$ and $x_2(k)$ vary according to the symbol index k.

Specifically, when k=4n (n=0, 1, ... ) and k=4n+2 (n=0, 1, ... ) (k is an even number), the constellation of the first transmission signal $x_1(k)$ may be expressed as constellation points at which $c_1(k)$ having small power of $\cos(\pi/3+k\times\pi/2)$ is superposed with reference to $e^{j(\pi/7)}\times c_2(k)$ having great power of $\sin(\pi/3+k\times\pi/2)$, and thus the constellation of the first transmission signal $x_1(k)$ is expressed as a constellation 450-1, 470-1. In addition, in this case, the constellation of the second transmission signal $x_2(k)$ may be expressed as constellation points at which $e^{j(\pi/7)}\times c_2(k)$ having small power of $\cos(\pi/3+k\times\pi/2)$ is superposed with reference to $c_1(k)$ having great power of $\sin(\pi/3+k\times\pi/2)$, and thus the constellation of the second transmission signal $x_2(k)$ is expressed as a constellation 450-2, 470-2.

On the other hand, when k=4n+1 (n=0, 1, ... ) and k=4n+3 (n=0, 1, ... ) (k is an odd number), the constellation of the first transmission signal $x_1(k)$ may be expressed as constellation points at which $e^{j(\pi/7)}\times c_2(k)$ having small power of $\sin(\pi/3+k\times\pi/2)$ is superposed with reference to $c_1(k)$ having great power of $\cos(\pi/3+k\times\pi/2)$, and thus the constellation of the first transmission signal $x_1(k)$ is expressed as a constellation 460-1, 480-1. In addition, in this case, the constellation of the second transmission signal $x_2(k)$ may be expressed as constellation points at which $c_1(k)$ having small power of $\sin(\pi/3+k\times\pi/2)$ is superposed with reference to $e^{j(\pi/7)}\times c_2(k)$ having great power of $\cos(\pi/3+k\times\pi/2)$, and thus the constellation of the second transmission signal $x_2(k)$ is expressed as a constellation 460-2, 480-2.

In the constellations 450-1 to 480-1 of FIG. 4, a solid-line white circle ○ and a solid-line white square □ correspond to constellation points of a precoded symbol of the first transmission signal $x_1(k)$, and, in the constellations 450-2 to 480-2, a solid-line white square □ and a solid-line white circle ○ correspond to constellation points of a precoded symbol of the second transmission signal $x_2(k)$. Since the constellation point of each transmission signal is determined by a combination of the 4-QAM first input signal $c_1(k)$ and the 4-QAM second input signal $c_2(k)$ as described above, the first transmission signal $x_1(k)$ and the second transmission signal $x_2(k)$ each have 16(=4×4) constellation points.

Referring to FIG. 4, the constellations of the transmission signals $x_1(k)$ and $x_2(k)$ are spherical constellations. Therefore, in the case of FIG. 4, the peak-symbol energy can be reduced in comparison with that before the pre-phase shift is applied, and the transmit diversity increases and thus BER performance can be improved.

In addition, since the superposition encoding parameter $\psi(k)$ varies according to the symbol index k, the precoded symbols constituting the transmission signals $x_1(k)$ and $x_2(k)$ include symbols which are generated by superposing the first input signal $c_1(k)$ having great power and the second input signal $c_2(k)$ having small power, and symbols which are generated by superposing the second input signal $c_2(k)$ having great power and the first input signal $c_1(k)$ having small power. Accordingly, even when a problem occurs in a single transmission antenna during the MIMO transmission, the transmit diversity can increase. In addition, signs of the first input signal and the second input signal constituting the first transmission signal and the second transmission signal, which are superposition encoded according to the symbol index k, vary with time, and bit-to-symbol mapping varies with time, and as a result, the transmit diversity may increase in comparison with the case of FIG. 2.

In FIG. 4, $\theta=\pi/7$ and $\psi(k)=\pi/3+k\times\pi/2$. However, this is merely an example, and $\theta$ and $\psi(k)$ are variable.

In another example, the MIMO precoder 110 may perform MIMO precoding by using Equation 4 presented below:

$$\begin{bmatrix} x_1(k) \\ x_2(k) \end{bmatrix} = \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta} \end{bmatrix} \begin{bmatrix} c_1(k) \\ c_2(k) \end{bmatrix}, \quad (4)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi(k) & \sin\psi(k) \\ \sin\psi(k) & -\cos\psi(k) \end{bmatrix}$$

is a superposition encoding matrix, $\theta(k)$ is a pre-phase shift/hopping parameter for a $k^{th}$ symbol, and $\psi(k)$ is a superposition encoding parameter for a $k^{th}$ symbol.

Referring to Equation 4, since the pre-phase shift/hopping parameter $\theta(k)$ and the superposition encoding parameter $\psi(k)$ are a function of the symbol index k, the pre-phase shift/hopping parameter $\theta(k)$ and the superposition encoding parameter $\psi(k)$ vary according to the symbol index k. That is, Equation 4 differs from Equation 1 in that the phase of the second input signal $c_2(k)$ is pre-phase hopped by a predetermined value in sequence according to the symbol index k, and the size and sign of the first input signal $c_1(k)$ and the second input signal $c_2(k)$ which constitute the first transmission signal $x_1(k)$ and the second transmission signal $x_2(k)$ vary according to the symbol index k.

Figure 5:
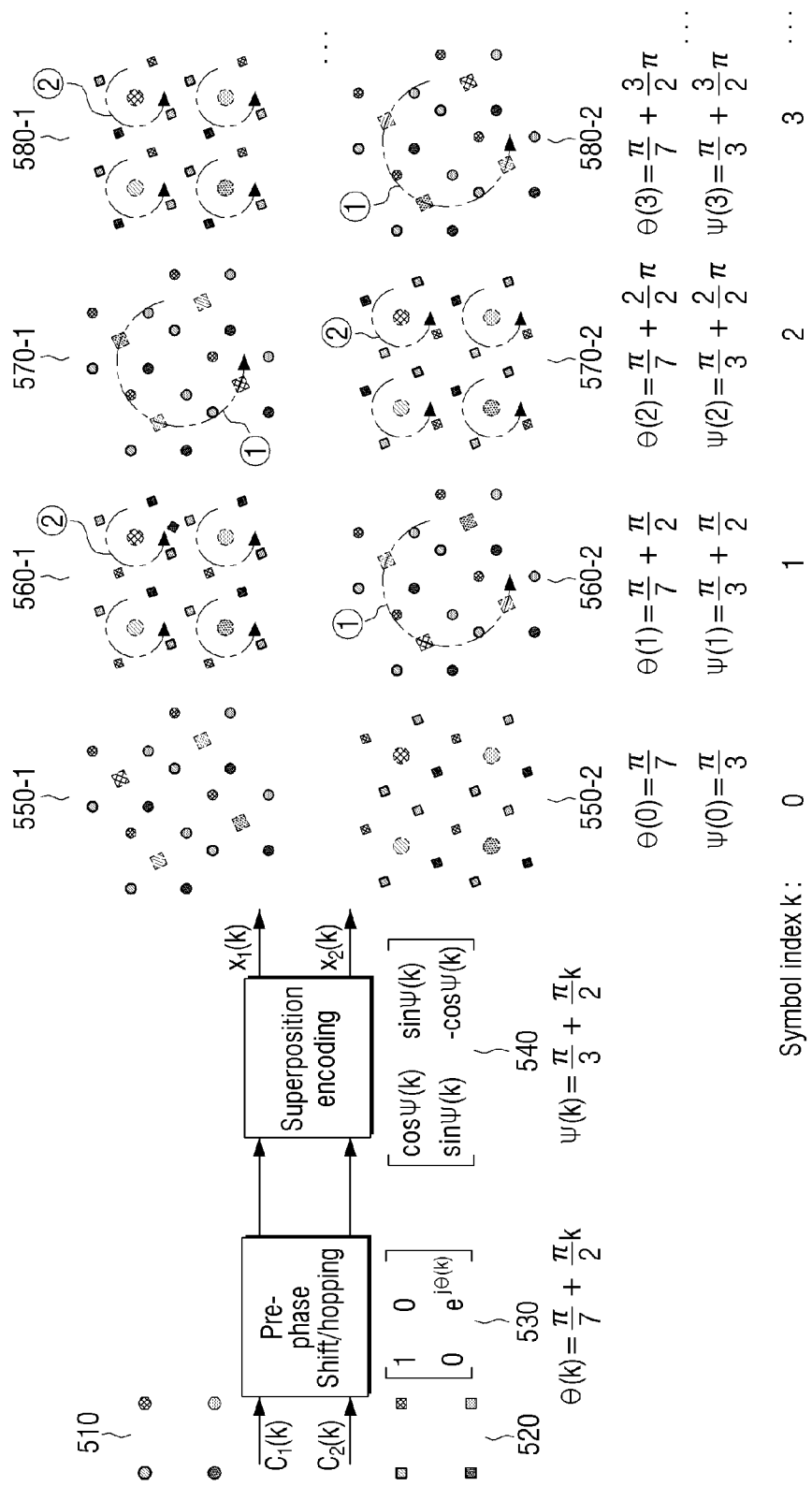

Hereinafter, a method for generating transmission signals by MIMO precoding when $\theta(k)=\pi/7+k\times\pi/2$ and $\psi(k)=\pi/3+k\times\pi/2$ will be explained with reference to FIG. 5. In FIG. 5, it is assumed that 4-QAM symbols are input to the MIMO precoder 110 in sequence in pair, and constitute the first input signal $c_1(k)$ and the second input signal $c_2(k)$. Accordingly, the constellations of the first input signal $c_1(k)$ and the second input signal $c_2(k)$ are expressed as a constellation 510 and a constellation 520, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift/hopping matrix 530 and a superposition encoding matrix 540 in sequence.

Herein, since $\theta(k)=\pi/7+k\times\pi/2$, the phase of the second input signal $c_2(k)$ is pre-phase hopped by $\pi/2$ in sequence according to the symbol index k, and since $\psi(k)=\pi/3+k\times\pi/2$, the size and sign of the first input signal $c_1(k)$ and the second input signal $c_2(k)$ constituting the first transmission signal $x_1(k)$ and the second transmission signal $x_2(k)$ vary according to the symbol index k.

Accordingly, the constellation of the first transmission signal $x_1(k)$ may be expressed as a constellation 550-1, 560-1, 570-1, 580-1, and the constellation of the second transmission signal $x_2(k)$ may be expressed as a constellation 550-2, 560-2, 570-2, 580-2.

In the constellations 550-1 to 580-1 of FIG. 5, a solid-line white circle ○ and a solid-line white square □ correspond to constellation points of a precoded symbol of the first transmission signal $x_1(k)$, and, in the constellations 550-2 to 580-2, a solid-line white square □ and a solid-line white circle ○ correspond to constellation points of a precoded symbol of the second transmission signal $x_2(k)$. Since the constellation point of each transmission signal is determined by a combination of the 4-QAM first input signal $c_1(k)$ and the 4-QAM second input signal $c_2(k)$ as described above, the first transmission signal $x_1(k)$ and the second transmission signal $x_2(k)$ each have 16(=4×4) constellation points.

Referring to FIG. 5, the precoded symbols constituting the transmission signals $x_1(k)$ and $x_2(k)$ include symbols which are generated by superposing the first input signal $c_1(k)$ having great power and the second input signal $c_2(k)$ having small power according to the symbol index, and symbols which are generated by superposing the second input signal $c_2(k)$ having great power and the first input signal $c_1(k)$ having small power. In addition, the constellation of the precoded symbol has a spherical shape and is shifted according to the symbol index as indicated ① and ②.

Accordingly, in the case of FIG. 5, the peak-symbol energy can be reduced in comparison with that before the pre-phase shift/hopping is applied, and the transmit diversity increases and thus BER performance can be improved.

In FIG. 5, $\theta(k)=\pi/7+k\times\pi/2$ and $\psi(k)=\pi/3+k\times\pi/2$. However, this is merely an example, and $\theta(k)$ and $\psi(k)$ are variable.

The MIMO precoder 110 may perform MIMO precoding by additionally performing post-phase shifting or post-phase hopping after having superposed the first input signal and the pre-phase shifted or pre-phase shifted/hopped second input signal.

Herein, the post-phase shifting refers to shifting the phase of a QAM symbol which has been pre-phase shifted or pre-phase shifted/hopped and superposition encoded by a predetermined value. For example, when the post-phase shift parameter $\phi$ is $\pi/7$, the phase of the QAM symbol may be shifted by $\pi/7$ by the post-phase shifting.

The post-phase hopping refers to hopping the phase of the QAM symbol which has been pre-phase shifted or pre-phase shifted/hopped and superposition encoded by a predetermined value in sequence according to the symbol index. That is, when the post-phase hopping parameter $\phi(k)$ is $k\times\pi/7$, the phase of the QAM symbol may be hopped by $\pi/7$ in sequence according to the symbol index k by the post-phase hopping.

In this description, the terms "pre" and "post" are added to the terms "phase-shifting" and "phase-hopping" because the post-phase shifting and the post-phase hopping are performed after the pre-phase shifting and the pre-phase shifting/hopping in order.

In this case, the post-phase shifting and the post-phase hopping may be performed by multiplying by a post-phase shift matrix and a post-phase hopping matrix, respectively. That is, the MIMO precoder 110 may perform MIMO precoding by multiplying the input signals by the pre-phase shift matrix or the pre-phase shift/hopping matrix and the superposition encoding matrix as shown in Equations 1 to 4, and then additionally multiplying the resulting values by the post-phase shift matrix or the post-phase hopping matrix.

For example, the MIMO precoder 110 may perform MIMO precoding by using Equation 5 presented below:

$$\begin{bmatrix} x_1(k) \\ x_2(k) \end{bmatrix} = \begin{bmatrix} 1 & 0 \\ 0 & e^{j\phi} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix}, \quad (5)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi} \end{bmatrix}$$

is a post-phase shift matrix, $\theta(k)$ is a pre-phase shift/hopping parameter for a $k^{th}$ symbol, $\psi$ is a superposition encoding parameter, and $\phi$ is a post-phase shift parameter.

Referring to Equation 5, Equation 5 equals the signal generated by Equation 2 additionally multiplied by the post-phase shift matrix Specifically, when the signals generated by Equation 2 are $s_1(k)=\cos\psi \times c_1(k)+e^{j\theta(k)}\times\sin\psi \times c_2(k)$ and $s_2(k)=\sin\psi \times c_1(k)-e^{j\theta(k)}\times\cos\psi \times c_2(k)$, transmission signals $x_1(k)=s_1(k)$ and $x_2(k)=e^{j\phi}\times s_2(k)$ may be generated by MIMO precoding according to Equation 5. That is, the transmission signals generated by Equation 5 equal $s_2(k)$ from among the signals generated by Equation 2 the phase of which is post-phase shifted by $\phi$.

Figure 6:
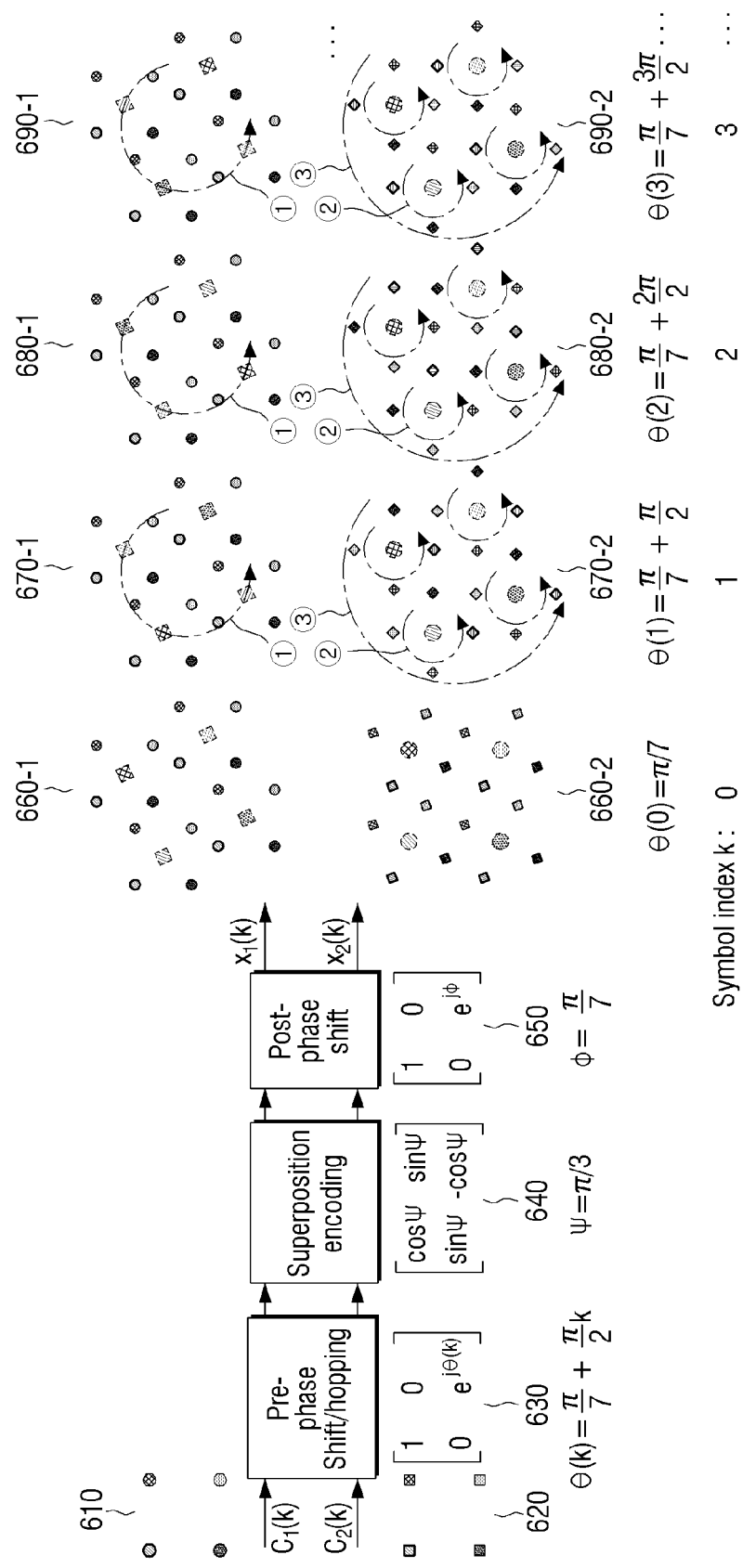

Hereinafter, a method for generating transmission signals by MIMO precoding when $\theta(k)=\pi/7+k\times\pi/2$, $\psi=\pi/3$, and $\phi=\pi/7$ will be explained with reference to FIG. 6. In FIG. 6, it is assumed that 4-QAM symbols are input to the MIMO precoder 110 in sequence in pair, and constitute the first input signal $c_1(k)$ and the second input signal $c_2(k)$. Accordingly, the constellations of the first input signal $c_1(k)$ and the second input signal $c_2(k)$ are expressed as a constellation 610 and a constellation 620, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift/hopping matrix 630, a superposition encoding matrix 640, and a post-phase shift matrix 650 in sequence.

Since a result of multiplying the input signals $c_1(k)$ and $c_2(k)$ by the pre-phase shift/hopping matrix 630 and the superposition encoding matrix 640 in sequence is the same as that of FIG. 3, a detailed description thereof is omitted. The signals which are generated by multiplying the input signals $c_1(k)$ and $c_2(k)$ by the pre-phase shift/hopping matrix 630 and the superposition encoding matrix 640 may be $s_1(k)=\cos\pi/3\times c_1(k)+e^{j(\pi/7+k\times\pi/2)}\times\sin\pi/3\times c_2(k)$ and $s_2(k)=\sin\pi/3\times c_1(k)-e^{j(\pi/7+k\times\pi/2)}\times\cos\pi/3\times c_2(k)$.

In this case, when $s_1(k)$ and $s_2(k)$ are multiplied by the post-phase shift matrix 650 to generate the transmission signals $x_1(k)$ and $x_2(k)$, the transmission signals $x_1(k)=s_1(k)$ and $x_2(k)=e^{j\pi/7}\times s_2(k)$ are generated. As described above, the first transmission signal $x_1(k)$ may equal $s_1(k)$ and the second transmission signal $x_2(k)$ may equal $s_2(k)$ post-phase shifted by $\pi/7$.

Accordingly, the constellation of the first transmission signal $x_1(k)$ may be expressed as a constellation 660-1, 670-1, 680-1, 690-1, and the constellation of the second transmission signal $x_2(k)$ may be expressed as a constellation 660-2, 670-2, 680-2, 690-2.

In the constellations 660-1 to 690-1 of FIG. 6, a solid-line white circle ○ corresponds to a constellation point of a precoded symbol of the first transmission signal $x_1(k)$, and, in the constellations 660-2 to 690-2, a solid-line white square □ corresponds to a constellation point of a precoded symbol of the second transmission signal $x_2(k)$. Since the constellation point of each transmission signal is determined by a combination of the 4-QAM first input signal $c_1(k)$ and the 4-QAM second input signal $c_2(k)$ as described above, the first transmission signal $x_1(k)$ and the second transmission signal $x_2(k)$ each have 16(=4×4) constellation points.

Referring to FIG. 6, the constellations 660-1, 670-1, 680-1, 690-1 of the first transmission signal $x_1(k)$ are the same as the constellations 350-1, 360-1, 370-1, 380-1 of the first transmission signal $x_1(k)$ shown in FIG. 3, and the constellation 660-2 of the second transmission signal $x_2(k)$ is the same as the constellation 350-2 of the second transmission signal $x_2(k)$ of FIG. 3. However, the constellations 670-2, 680-2, and 690-2 of the second transmission signal $x_2(k)$ equal the constellations 360-2, 370-2, and 380-2 of the second transmission signal $x_2(k)$ of FIG. 3 entirely shifted by $\pi/7$ as indicated by ③.

As described above, since the entire constellation of the transmission signal is shifted by the post-phase shifting, an additional transmit diversity gain can be obtained.

In another example, the MIMO precoder 110 may perform MIMO precoding by using Equation 6 presented below:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix}, \quad (6)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi(k)} \end{bmatrix}$$

is a post-phase hopping matrix, $\theta(k)$ is a pre-phase shift hopping parameter for a $k^{th}$ symbol, $\psi$ is a superposition encoding parameter, and $\phi(k)$ is a post-phase hopping parameter for a $k^{th}$ symbol.

Referring to Equation 6, Equation 6 equals the signal generated by Equation 2 additionally multiplied by the post-phase hopping matrix Specifically, when the signals generated by Equation 2 are $s_1(k)=\cos\psi \times c_1(k)+e^{j\theta(k)} \times \sin\psi \times c_2(k)$ and $s_2(k)=\sin\psi \times c_1(k)-e^{j\theta(k)} \times \cos\psi \times c_2(k)$, transmission signals $x_1(k)=s_1(k)$ and $x_2(k)=e^{j\phi(k)} \times s_2(k)$ may be generated by MIMO precoding according to Equation 6. That is, the transmission signals generated by Equation 6 equal $s_2(k)$ from among the signals generated by Equation 2 the phase of which is post-phase hopped by $\phi(k)$.

Since the post-phase hopping refers to rotating the phase of each symbol by a predetermined value in sequence according to the symbol index as described above, Equation 6 differs from Equation 5 in that the post-phase hopping parameter $\phi(k)$ is a function of the symbol index k.

Figure 7:
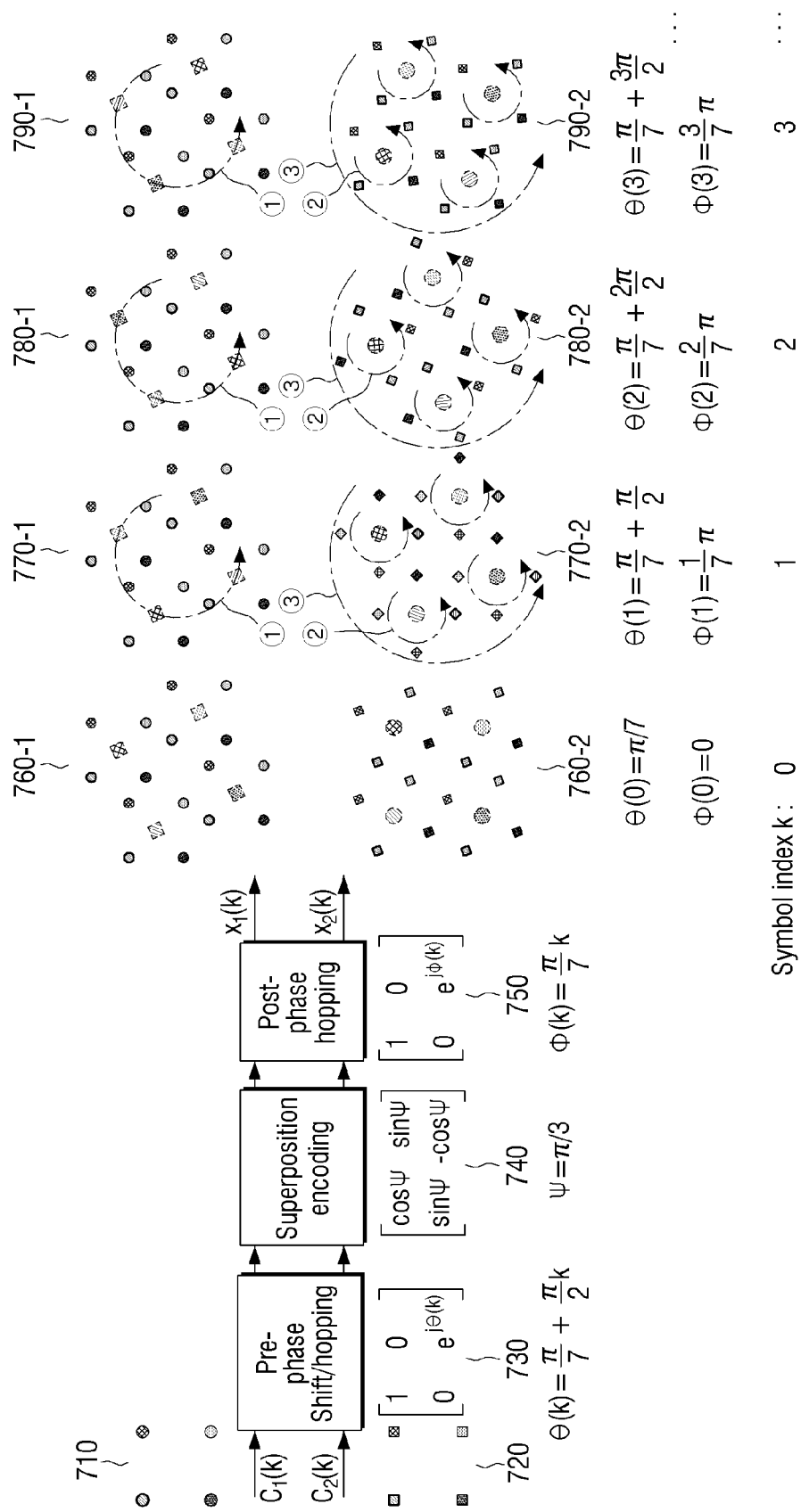

Hereinafter, a method for generating transmission signals by MIMO precoding when $\theta(k)=\pi/7+k\times 2$, $\psi=\pi/3$, and $\phi(k)=k\times\pi/7$ will be explained with reference to FIG. 7. In FIG. 7, it is assumed that 4-QAM symbols are input to the MIMO precoder 110 in sequence in pair, and constitute the first input signal $c_1(k)$ and the second input signal $c_2(k)$. Accordingly, the constellations of the first input signal $c_1(k)$ and the second input signal $c_2(k)$ are expressed as a constellation 710 and a constellation 720, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift/hopping matrix 730, a superposition encoding matrix 740, and a post-phase hopping matrix 750 in sequence.

Since the result of multiplying the input signals $c_1(k)$ and $c_2(k)$ by the pre-phase shift/hopping matrix 730 and the superposition encoding matrix 740 in sequence is the same as that of FIG. 3, a detailed description thereof is omitted. The signals which are generated by multiplying the input signals $c_1(k)$ and $c_2(k)$ by the pre-phase shift/hopping matrix 730 and the superposition encoding matrix 740 may be $s_1(k)=\cos\pi/3 \times c_1(k)+e^{j(\pi/7+k\times\pi/2)}\times\sin\pi/3\times c_2(k)$ and $s_2(k)=\sin\pi/3\times c_1(k)-e^{j(\pi/7+k\times\pi/2)}\times\cos\pi/3\times c_2(k)$.

In this case, when $s_1(k)$ and $s_2(k)$ are multiplied by the post-phase hopping matrix 750 to generate the transmission signals $x_1(k)$ and $x_2(k)$, the transmission signals $x_1(k)=s_1(k)$ and $x_2(k)=e^{j(k\times\pi/7)}\times s_2(k)$ are generated.

As described above, the second transmission signal $x_2(k)$ may be generated by post-phase hopping $s_2(k)$ by $k\times\pi/7$ according to the symbol index k. For example, the $0^{th}$ symbol $x_2(0)$ of the second transmission signal equals $s_2(0)$, the $1^{st}$ symbol $x_2(1)$ of the second transmission signal equals $s_2(1)$ post-phase hopped by $\pi/7$, the $2^{nd}$ symbol $x_2(2)$ of the second transmission signal equals $s_2(2)$ post-phase hopped by $2\times\pi/7$, and the $3^{rd}$ symbol $x_2(3)$ of the second transmission signal equals $s_2(3)$ post-phase hopped by $3\times\pi/7$.

Accordingly, the constellation of the first transmission signal $x_1(k)$ may be expressed as a constellation 760-1, 770-1, 780-1, 790-1, and the constellation of the second transmission signal $x_2(k)$ may be expressed as a constellation 760-2, 770-2, 680-2, 690-2.

In the constellations 760-1 to 790-1 of FIG. 6, a solid-line white circle ○ corresponds to a constellation point of a precoded symbol of the first transmission signal $x_1(k)$, and, in the constellations 760-2 to 790-2, a solid-line white square □ corresponds to a constellation point of a precoded symbol of the second transmission signal $x_2(k)$. Since the constellation point of each transmission signal is determined by a combination of the 4-QAM first input signal $c_1(k)$ and the 4-QAM second input signal $c_2(k)$ as described above, the first transmission signal $x_1(k)$ and the second transmission signal $x_2(k)$ each have 16(=4×4) constellation points.

Referring to FIG. 7, the constellations 760-1, 770-1, 780-1, 790-1 of the first transmission signal $x_1(k)$ are the same as the constellations 350-1, 360-1, 370-1, 380-1 of the first transmission signal $x_1(k)$ shown in FIG. 3, and the constellation 760-2 of the second transmission signal $x_2(k)$ is the same as the constellation 350-2 of the second transmission signal $x_2(k)$ of FIG. 3. However, the constellations 770-2, 780-2, and 790-2 of the second transmission signal $x_2(k)$ equal the constellations 360-2, 370-2, and 380-2 of the second transmission signal $x_2(k)$ of FIG. 3 entirely shifted by $k\times\pi/7$ according to the symbol index k as indicated by ③.

As described above, since the entire constellation of the transmission signal is hopped by the post-phase hopping, and in particular, is hopped by a predetermined phase in sequence according to the symbol index, an additional transmit diversity gain can be obtained.

The pre-phase shift/hopping parameter, the superposition encoding parameter, the post-phase shifting parameter, and the post-phase hopping parameter used in FIGS. 6 and 7 are merely examples and are variable.

In addition, although the pre-phase shift/hopping matrix and the superposition encoding matrix used in the MIMO precoding in FIGS. 6 and 7 have the forms shown in Equation 2, this is merely an example. That is, the MIMO precoder 110 may perform MIMO precoding by additionally multiplying with the post-phase shift matrix or the post-phase hopping matrix in addition to the pre-phase shift matrix or pre-phase shift/hopping matrix and the superposition encoding matrix, as defined in Equation 1, Equation 3, and Equation 4 in addition to Equation 2.

Hereinafter, a method for performing MIMO precoding by additionally multiplying with the post-phase hopping matrix in addition to the pre-phase shift/hopping matrix and the superposition encoding matrix as defined in Equation 4 will be explained.

In this case, the MIMO precoder 110 may perform MIMO precoding by using Equation 7 presented below:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta(k)} \end{bmatrix} \begin{bmatrix} c_1(k) \\ c_2(k) \end{bmatrix}, \quad (7)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi(k) & \sin\psi(k) \\ \sin\psi(k) & -\cos\psi(k) \end{bmatrix}$$

is a superposition encoding matrix, $$\begin{bmatrix} 1 & 0 \\ 0 & e^{j\phi(k)} \end{bmatrix}$$

is a post-phase hopping matrix, $\theta(k)$ is a pre-phase shift hopping parameter for a $k^{th}$ symbol, $\psi(k)$ is a superposition encoding parameter for a $k^{th}$ symbol, and $\phi(k)$ is a post-phase hopping parameter for a $k^{th}$ symbol.

Referring to Equation 7, Equation 7 equals the signal generated by Equation 4 additionally multiplied by the post-phase shift matrix Specifically, when the signals generated by Equation 4 are $s_1(k)=\cos\psi(k)\times c_1(k)+\sin\psi(k)\times e^{j\theta(k)}\times c_2(k)$ and $s_2(k)=\sin\psi(k)\times c_1(k)-\cos\psi(k)\times e^{j\theta(k)}\times c_2(k)$, transmission signals $x_1(k)=s_1(k)$ and $x_2(k)=e^{j\phi(k)}\times s_2(k)$ may be generated by MIMO precoding according to Equation 7. That is, the transmission signals generated by Equation 7 equal $s_2(k)$ from among the signals generated by Equation 4 the phase of which is post-phase shifted/hopped by $\phi(k)$.

Figure 8:
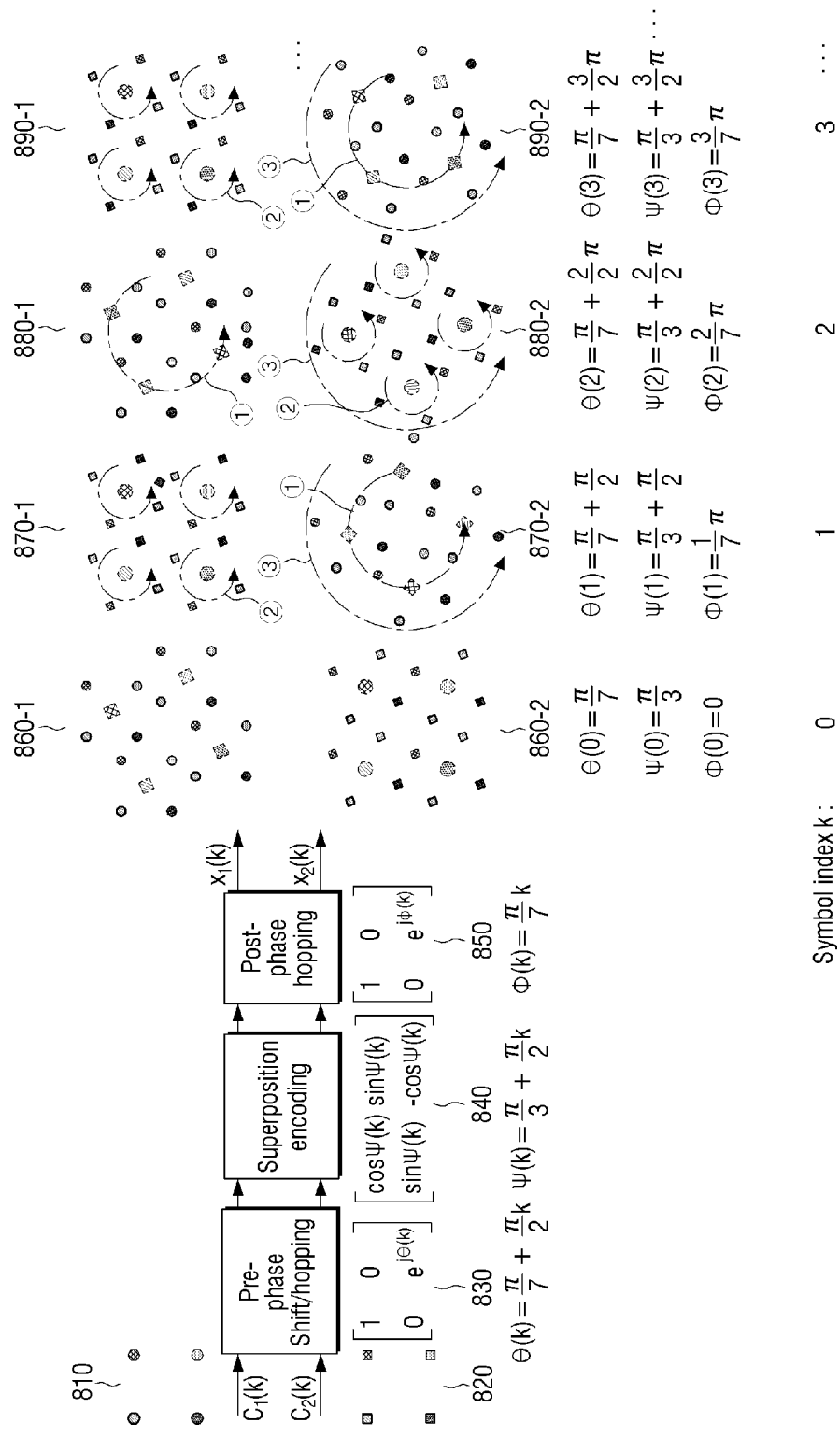

Hereinafter, a method for generating transmission signals by MIMO precoding when $\theta(k)=\pi/7+k\times\pi/2$, $\psi(k)=\pi/3+k\times\pi/2$ and $\phi(k)=k\times\pi/7$ will be explained with reference to FIG. 8. In FIG. 8, it is assumed that 4-QAM symbols are input to the MIMO precoder 110 in sequence in pair, and constitute the first input signal $c_1(k)$ and the second input signal $c_2(k)$. Accordingly, the constellations of the first input signal $c_1(k)$ and the second input signal $c_2(k)$ are expressed as a constellation 810 and a constellation 820, respectively.

The MIMO precoder 110 may generate the first transmission signal $x_1(k)$ and the second transmission signal $x_2(k)$ by multiplying the first input signal $c_1(k)$ and the second input signal $c_2(k)$ by a pre-phase shift/hopping matrix 830, a superposition encoding matrix 840, and a post-phase hopping matrix 850 in sequence.

Since a result of multiplying the input signals $c_1(k)$ and $c_2(k)$ by the pre-phase shift/hopping matrix 830 and the superposition encoding matrix 840 in sequence is the same as that of FIG. 5, a detailed description thereof is omitted. The signals which are generated by multiplying the input signals $c_1(k)$ and $c_2(k)$ by the pre-phase shift/hopping matrix 830 and the superposition encoding matrix 840 may be $s_1(k)=\cos(\pi/3+k\times\pi/2)\times c_1(k)+e^{j(\pi/7+k\times\pi/2)}\times\sin(\pi/3+k\times\pi/2)\times c_2(k)$ and $s_2(k)=\sin(\pi/3+k\times\pi/2)\times c_1(k)-e^{j(\pi/7+k\times\pi/2)}\times\cos(\pi/3+k\times\pi/2)\times c_2(k)$.

In this case, when $s_1(k)$ and $s_2(k)$ are multiplied by the post-phase hopping matrix 850 to generate the transmission signals $x_1(k)$ and $x_2(k)$, the transmission signals $x_1(k)=s_1(k)$ and $x_2(k)=e^{j(k\times\pi/7)}\times s_2(k)$ are generated.

As described above, the second transmission signal $x_2(k)$ may be generated by post-phase hopping $s_2(k)$ by $k\times\pi/7$ according to the symbol index k. For example, the $0^{th}$ symbol $x_2(0)$ of the second transmission signal equals $s_2(0)$, the $1^{st}$ symbol $x_2(1)$ of the second transmission signal equals $s_2(1)$ post-phase hopped by $\pi/7$, the $2^{nd}$ symbol $x_2(2)$ of the second transmission signal equals $s_2(2)$ post-phase hopped by $2\times\pi/7$, and the $3^{rd}$ symbol $x_2(3)$ of the second transmission signal equals $s_2(3)$ post-phase hopped by $3\times\pi/7$.

Accordingly, the constellation of the first transmission signal $x_1(k)$ may be expressed as a constellation 860-1, 870-1, 880-1, 890-1, and the constellation of the second transmission signal $x_2(k)$ may be expressed as a constellation 860-2, 870-2, 880-2, 890-2.

In the constellations 860-1, 870-1, 880-1, 890-1 of FIG. 8, a solid-line white circle ○ and a solid-line white square □ correspond to constellation points of a precoded symbol of the first transmission signal $x_1(k)$, and, in the constellations 860-2, 870-2, 880-2, 890-2, a solid-line white square □ and a solid-line white circle ○ correspond to constellation points of a precoded symbol of the second transmission signal $x_2(k)$. Since the constellation point of each transmission signal is determined by a combination of the 4-QAM first input signal $c_1(k)$ and the 4-QAM second input signal $c_2(k)$ as described above, the first transmission signal $x_1(k)$ and the second transmission signal $x_2(k)$ each have $16(=4\times 4)$ constellation points.

Referring to FIG. 8, the constellations 860-1, 870-1, 880-1, 890-1 of the first transmission signal $x_1(k)$ are the same as the constellations 550-1, 560-1, 570-1, 580-1 of the first transmission signal $x_1(k)$ shown in FIG. 5, and the constellation 860-2 of the second transmission signal $x_2(k)$ is the same as the constellation 550-2 of the second transmission signal $x_2(k)$ of FIG. 5. However, the constellations 870-2, 880-2, and 890-2 of the second transmission signal $x_2(k)$ equal the constellations 560-2, 570-2, and 580-2 of the second transmission signal $x_2(k)$ of FIG. 3 entirely shifted by $k\times\pi/7$ according to the symbol index k as indicated by ③.

As described above, since the entire constellation of the transmission signal is shifted by the post-phase hopping, and in particular, is shifted by a different phase according to the symbol index k, an additional transmit diversity gain can be obtained.

The MIMO precoder 110 may perform MIMO precoding by allocating different power to the first input signal and the second input signal prior to pre-phase shifting the second input signal.

That is, when the pair of modulation symbols input to the MIMO precoder 110 is asymmetric, the MIMO precoder 110 may additionally perform a process of allocating different power to each input signal when MIMO precoding. For example, the MIMO precoder 110 may perform MIMO precoding by using Equation 8 presented below:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} \sqrt{\gamma} & 0 \\ 0 & \sqrt{1-\gamma} \end{bmatrix} \begin{bmatrix} c_1(k) \\ c_2(k) \end{bmatrix} \quad (8)$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} \sqrt{\gamma} & 0 \\ 0 & \sqrt{1-\gamma} \end{bmatrix}$$

is a power allocation matrix, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi(k)} \end{bmatrix}$$

is a post-phase hopping matrix, γ is a power allocation parameter, θ(k) is a pre-phase shift/hopping parameter for a $k^{th}$ symbol, ψ is a superposition encoding parameter, and φ(k) is a post-phase hopping parameter for a $k^{th}$ symbol.

Referring Equation 8, the MIMO precoder 110 may generate the transmission signals $x_1(k)$ and $x_2(k)$ by performing MIMO precoding by multiplying the input signals $c_1(k)$ and $c_2(k)$ by the power allocation matrix and then by multiplying with the pre-phase shift/hopping matrix, the superposition encoding matrix, and the post-phase hopping matrix in sequence.

When the power allocation parameter γ (0<γ<1) has a value other than 0.5, the MIMO precoder 110 may allocate different power to input signals through the power allocation matrix when MIMO precoding. Accordingly, a transmission channel capacity can be improved.

In the above-described example, the MIMO precoder 110 allocates different power to the input signals through the power allocation matrix when MIMO precoding is performed. However, this is merely an example and the MIMO precoder 110 may allocate the same power to the input signals. That is, when the power allocation parameter γ is 0.5, the MIMO precoder 110 may allocate the same power to the input signals through the power allocation matrix. The power allocation parameter γ may vary according to a modulation method of input signals as shown in Table 1 presented below:

TABLE 1

| Modulation pair | | r |
|---|---|---|
| $c_1(k)$ | 4-QAM | 0.3212 |
| $c_2(k)$ | 16-QAM | |
| $c_1(k)$ | 16-QAM | 0.4569 |
| $c_2(k)$ | 16-QAM | |
| $c_1(k)$ | 16-QAM | 0.4427 |
| $c_2(k)$ | 64-QAM | |
| $c_1(k)$ | 64-QAM | 0.5 |
| $c_2(k)$ | 64-QAM | |
| $c_1(k)$ | 64-QAM | 0.4712 |
| $c_2(k)$ | 256-QAM | |

Referring to Equation 8, the pre-phase shift/hopping matrix, the superposition encoding matrix, and the post-phase hopping matrix used in the MIMO precoding have the forms as shown in Equation 6. However, this is merely an example.

That is, the matrices defined in Equations 5 and 7 in addition to Equation 6 may be used when the MIMO precoding is performed by additionally multiplying by the power allocation matrix.

The MIMO precoder 110 may perform MIMO precoding by multiplying the input signals by the power allocation matrix, and then, multiplying the resulting signals by the pre-phase shift matrix or the pre-phase shift/hopping matrix and the superposition encoding matrix defined in Equations 1 to 4 in sequence.

As described above in Equations 1 to 8, the first transmission signal $x_1(k)$ and the second transmission signal $x_2(k)$ are generated by MIMO precoding by multiplying the first input signal $c_1(k)$ and the second input signal $c_2(k)$ by predetermined matrices. Accordingly, the single 2×2 matrix generated by multiplying by matrices used in MIMO precoding in each Equation may be referred to as a precoding matrix.

Figure 9:
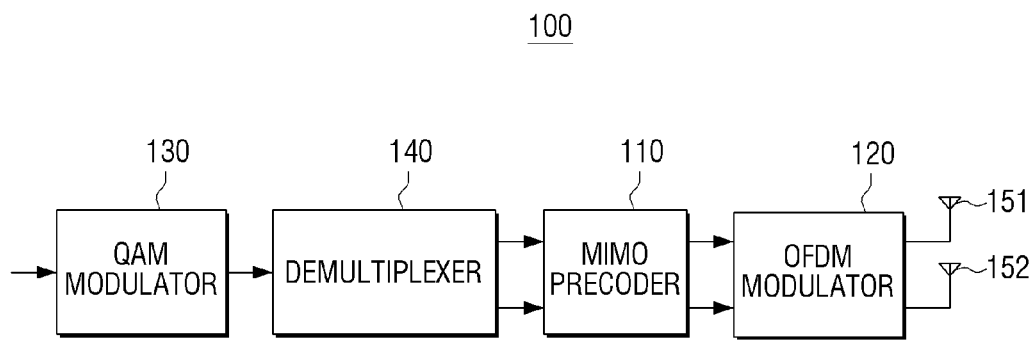
FIG. 9 is a block diagram to illustrate a detailed configuration of a transmitter according to an exemplary embodiment.

FIG. 9 is a block diagram to illustrate a detailed configuration of a transmitter according to an exemplary embodiment.

Referring to FIG. 9, the transmitter 100 includes a QAM modulator 130, a demultiplexer 140, a MIMO precoder 110, an OFDM modulator 120, a first transmission antenna 151, and a second transmission antenna 152. The MIMO precoder 110 and the OFDM modulator 120 of FIG. 9 are the same as the MIMO precoder 110 and the OFDM modulator 120 of FIG. 1, and thus, a redundant explanation is omitted.

The QAM modulator 130 performs QAM modulation with respect to input data. That is, the QAM modulator 130 modulates bits to be transmitted to a receiver (not shown) in various modulation methods such as 4-QAM, 16-QAM, 64-QAM, 256-QAM, 1024-QAM, 4096-QAM, etc., and outputs QAM symbols (or modulation symbols) generated by the QAM modulation to the demultiplexer 140. In this case, the QAM symbols may configure a uniform constellation or a non-uniform constellation. The QAM modulator 130 may modulate the input data in the same modulation method or may modulate the input data in different methods according to circumstances.

For example, the QAM modulator 130 may modulate some bits in the 4-QAM method and modulate the other bits in the 16-QAM method, and may output the QAM symbols generated according to different modulation methods to the demultiplexer 140. In another example, the QAM modulator 130 may modulate some bits in the 16-uniform QAM method and modulate the other bits in the 64-non uniform QAM (64-NUC), or may modulate some bits in the 64 uniform QAM and modulate the other bits in the 64-non uniform QAM (64-NUC), and may output the QAM symbols generated in different modulation methods to the demultiplexer 140.

As described above, the QAM symbols input to the demultiplexer 140 may configure various symmetric/asymmetric QAM symbol pairs.

The demultiplexer (or serial-to-parallel converter) 140 demultiplexes the input symbols and outputs the symbols to the MIMO precoder 110.

Specifically, the demultiplexer 140 may demultiplex the input QAM symbols and output some QAM symbols to the MIMO precoder 110 as a first input signal and output the other QAM symbols to the MIMO precoder 110 as a second input signal.

For example, the demultiplexer 140 may output odd numbered QAM symbols (or even numbered symbols), in terms of an order of input to the demultiplexer, from among the input QAM symbols to the MIMO precoder 110 as the first input signal, and may output the even numbered QAM symbols (or odd numbered symbols) to the MIMO precoder as the second input signal.

In another example, the demultiplexer 140 may demultiplex the input symbols such that the symbols modulated in the same modulation method are input the MIMO precoder 110 as the same input signal. For example, the demultiplexer 140 may output the modulation symbols of the 4-QAM method to the MIMO precoder 110 as the first input signal and may output the modulation symbols of the 16-QAM method to the MIMO precoder 110 as the second input signal. Alternatively, the demultiplexer 140 may output the modulation symbols modulated in the uniform constellation method to the MIMO precoder 110 as the first input signal and may output the modulation symbols modulated in the non-uniform constellation method to the MIMO precoder 110 as the second input signal.

Figure 10:
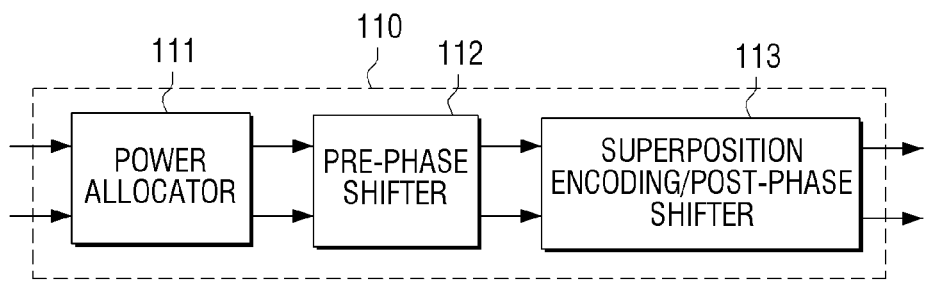
FIG. 10 is a block diagram to illustrate a detailed configuration of a MIMO precoder according to an exemplary embodiment.

The MIMO precoder 110 generates transmission signals by MIMO precoding the first input signal and the second input signal, and outputs the transmission signals to the OFDM modulator 120. To achieve this, the MIMO precoder 110 may include a power allocator 111, a pre-phase shifter 112, a superposition encoding/post-phase shifter 113 as shown in FIG. 10.

The power allocator 111 may allocate power to the first input signal and the second input signal. Specifically, when the QAM symbols input as the first input signal and the QAM symbols input as the second input signal correspond to asymmetric QAM symbol pairs, the power allocator 111 may multiply the input signals by a power allocation matrix and output the resulting value to the pre-phase shifter 112 to allocate different power to the first input signal and the second input signal.

Herein, an example of the power allocation matrix may be expressed as $$\begin{bmatrix} \sqrt{\gamma} & 0 \\ 0 & \sqrt{1-\gamma} \end{bmatrix}$$

and the power allocation parameter γ may be expressed as Equation 1 described above.

Accordingly, when the first input signal input to the MIMO precoder 110 is $c_1(k)$ and the second input signal is $c_2(k)$, the power allocator 111 may output $\sqrt{\gamma} \times c_1(k)$ and $\sqrt{1-\gamma} \times c_2(k)$ to the pre-phase shifter 112.

The pre-phase shifter 112 may pre-phase shift or pre-phase shift/hop the signals output from the power allocator 111.

Specifically, the pre-phase shifter 112 may multiply the signals output from the power allocator 111 by a pre-phase shift matrix or a pre-phase shift/hopping matrix, and may output the resulting value to the superposition encoding/post-phase shifter 113.

Herein, an example of the pre-phase shift matrix may be expressed as $$\begin{bmatrix} 1 & 0 \\ 0 & e^{j\theta} \end{bmatrix},$$

and an example of the pre-phase shift/hopping matrix may be expressed as $$\begin{bmatrix} 1 & 0 \\ 0 & e^{j\theta(k)} \end{bmatrix}.$$

In this case, the pre-phase shift parameter constituting the pre-phase shift matrix may have a constant value regardless of the symbol index k like θ, and the pre-phase shift/hopping parameter constituting the pre-phase shift/hopping matrix may be a function of the symbol index k like θ(k).

For example, when the pre-phase shifter 112 uses the pre-phase shift/hopping matrix like $$\begin{bmatrix} 1 & 0 \\ 0 & e^{j\theta(k)} \end{bmatrix},$$

the pre-phase shifter 112 may output $\sqrt{\gamma} \times c_1(k)$ and $e^{j\theta(k)} \times \sqrt{1-\gamma} \times c_2(k)$ to the superposition encoding/post-phase shifter 113.

The superposition encoding/post-phase shifter 113 may superposition encode and post-phase hop the signals output from the pre-phase shifter 112.

Specifically, the superposition encoding/post-phase shifter 113 may multiply the signals output from the pre-phase shifter 112 by a superposition encoding matrix and a post-phase shift matrix or a post-phase hopping matrix in sequence, and may output the resulting value to the OFDM modulator 120.

Herein, an example of the superposition encoding matrix may be $$\begin{bmatrix} \cos\psi & \sin\psi \\ \sin\psi & -\cos\psi \end{bmatrix}$$

or $$\begin{bmatrix} \cos\psi(k) & \sin\psi(k) \\ \sin\psi(k) & -\cos\psi(k) \end{bmatrix},$$

and the superposition encoding parameter constituting the superposition encoding matrix may have a constant value regardless of the symbol index k like ψ or may be a function of the symbol index k like ψ(k).

In addition, an example of the post-phase shift matrix may be expressed as $$\begin{bmatrix} 1 & 0 \\ 0 & e^{j\phi} \end{bmatrix},$$

and an example of the post-phase hopping matrix may be expressed as $$\begin{bmatrix} 1 & 0 \\ 0 & e^{j\phi(k)} \end{bmatrix}.$$

In this case, the post-phase shift parameter constituting the post-phase shift matrix may have a constant value regardless of the symbol index k like ϕ, and the post-phase hopping parameter constituting the post-phase hopping matrix may be a function of the symbol index k like ϕ(k).

For example, when the superposition encoding/post-phase shifter 113 uses the superposition encoding matrix like $$\begin{bmatrix} \cos\psi & \sin\psi \\ \sin\psi & -\cos\psi \end{bmatrix}$$

and uses the post-phase hopping matrix like $$\begin{bmatrix} 1 & 0 \\ 0 & e^{j\phi(k)} \end{bmatrix},$$

the superposition encoding/post-phase shifter 113 may output the first transmission signal $x_1(k)=(\cos\psi \times \sqrt{\gamma} \times c_1(k) + e^{j\theta(k)} \times \sin\psi \times \sqrt{1-\gamma} \times c_2(k)$ and the second transmission signal $x_2(k)=e^{j\phi(k)} \times (\sin\psi \times \sqrt{\gamma} \times c_1(k) - e^{j\theta(k)} \times \cos\psi \times \sqrt{1-\gamma} \times c_2(k)$ to the OFDM modulator 120.

In FIG. 10, the MIMO precoder 110 includes the power allocator 111, the pre-phase shifter 112, and the superposition encoding/post-phase shifter 113. However, this is merely an example.

That is, since the MIMO precoder 110 performs MIMO precoding based on Equations 1 to 8 as described above, the MIMO precoder 110 may include at least some of the elements of FIG. 10, and may include an superposition encoder (not shown) for performing only superposition encoding instead of the superposition encoding/post-phase shifter 113.

For example, when the MIMO precoder 110 performs MIMO precoding based on Equations 1 to 4, the MIMO precoder 110 may include the pre-phase shifter 112 and the superposition encoder (not shown), and, when the MIMO precoder 110 performs MIMO precoding based on Equations 5 to 7, the MIMO precoder 110 may include the pre-phase shifter 112 and the superposition encoding/post-phase shifter 113. In addition, when the MIMO precoder 110 performs MIMO precoding based on Equation 8, the MIMO precoder 110 may include the power allocator 111, the pre-phase shifter 112, and the superposition encoding/post phase shifter 113.

The OFDM modulator 120 may OFDM modulate the first transmission signal and the second transmission signal output from the MIMO precoder 110.

Specifically, the OFDM modulator 120 may map the first transmission signal and the second transmission signal onto different OFDM frames by OFDM modulating the first transmission signal and the second transmission signal, and may output an OFDM frame onto which the first transmission signal is mapped to the first transmission antenna 151, and may output an OFDM frame onto which the second transmission signal is mapped to the second transmission antenna 152.

The first transmission antenna 151 and the second transmission antenna 152 transmit the signals output from the OFDM modulator 120 to the receiver (not shown) in the MIMO method. That is, the first transmission antenna 151 transmits the OFDM frame onto which the first transmission signal is mapped to the receiver (not shown) via a channel, and the second transmission antenna 153 transmits the OFDM frame onto which the second transmission signal is mapped to the receiver (not shown) via a channel.

Figure 11:
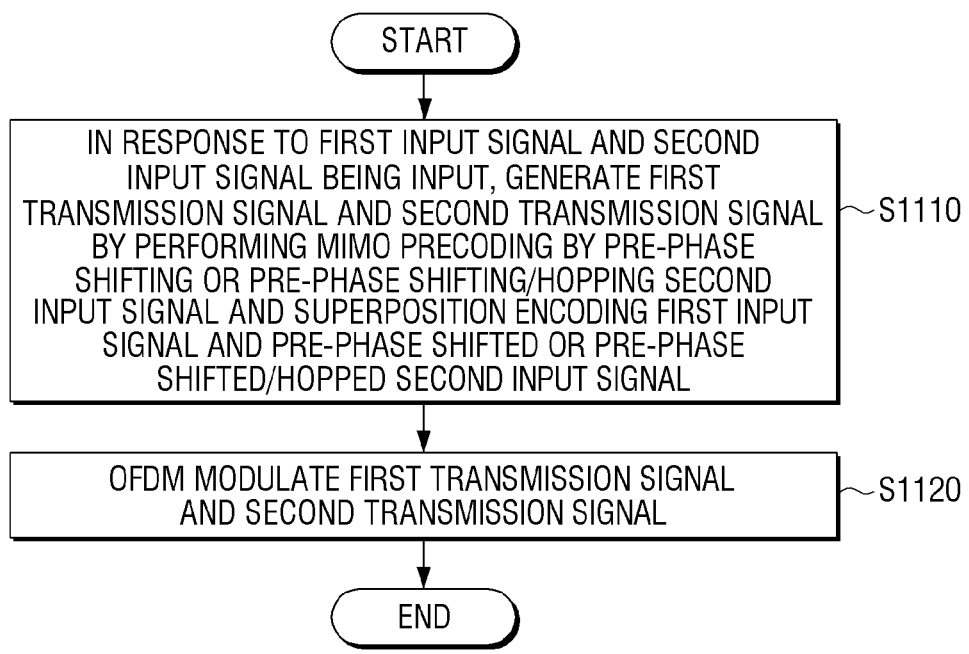
FIG. 11 is a flowchart to illustrate a precoding method according to an exemplary embodiment.

FIG. 11 is a flowchart to illustrate a precoding method according to an exemplary embodiment.

First, in response to a first input signal and a second input signal, the transmitter generates a first transmission signal and a second transmission signal by performing MIMO precoding by pre-phase shifting or pre-phase shifting/hopping the second input signal and superposition encoding the first input signal and the second input signal which is pre-phase shifted or pre-phase shifted/hopped (S1110).

Thereafter, the transmitter OFDM modulates the first transmission signal and the second transmission signal (S1120).

In performing the MIMO precoding in operation S1110, Equations 1 to 4 may be used and a detailed method related to each case has been described above.

In operation S1110, after superposition encoding the first input signal and the pre-phase shifted or pre-phase shifted/hopped second input signal, the transmitter may perform the MIMO precoding by additionally post-phase shifting or post-phase hopping. In this case, in performing the MIMO precoding, Equations 5 to 7 may be used and a detailed method related to each case has been described above.

In operation S1110, the transmitter may perform the MIMO precoding by allocating different power to the first input signal and the second input signal prior to pre-phase shifting or pre-phase shifting/hopping the second input signal. In this case, in performing the MIMO precoding, Equation 8 may be used and a detailed method related to this case has been described above.

Figure 12:
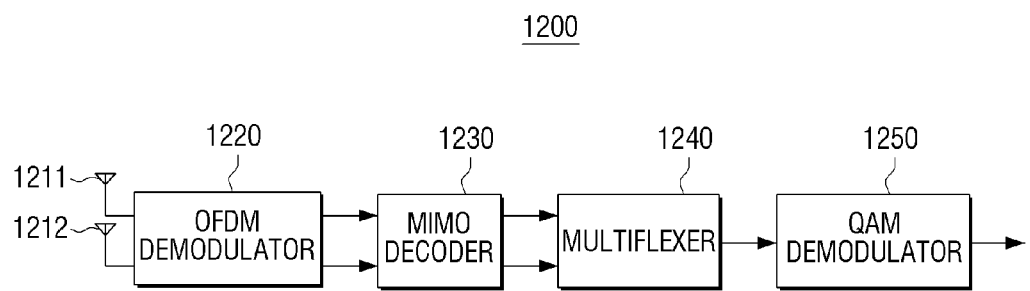
FIG. 12 is a block diagram to illustrate a configuration of a receiver according to an exemplary embodiment.

FIG. 12 is a block diagram to illustrate a configuration of a receiver according to an exemplary embodiment. Referring to FIG. 12, the receiver 1200 includes a first reception antenna 1211, a second reception antenna 1212, an OFDM demodulator 1220, a MIMO decoder 1230, a multiplexer 1240, and a QAM demodulator 1250.

The first reception antenna 1211 and the second reception antenna 1212 receive signals transmitted from the transmitter 100 via channels. In this case, since the transmitter 100 and the receiver 1200 exchanges signals with each other in the MIMO method, the first reception antenna 1211 and the second reception antenna 1212 may receive signals transmitted from the first transmission antenna 151 and the second transmission signal 152 of the transmitter 100, respectively.

The OFDM demodulator 1220 performs OFDM demodulation with respect to the signals received via the first reception antenna 1211 and the second reception antenna 1212.

Specifically, the OFDM demodulator 1220 is an element corresponding to the OFDM modulator 120 of the transmitter 100 and performs an operation corresponding to the OFDM modulator 120.

That is, since the transmitter 100 transmits an OFDM frame onto which the first transmission signal is mapped via the first transmission antenna 151, and transmits an OFDM frame onto which the second transmission signal is mapped via the second transmission antenna 152, the OFDM demodulator 1220 performs the OFDM demodulation with respect to the signals received via the first reception antenna 1211 and the second reception antenna 1212, and outputs a first reception signal $y_1(k)$ and a second reception signal $y_2(k)$ generated by the OFDM demodulation to the MIMO decoder 1230.

The MIMO decoder 1230 performs MIMO decoding by using the signals transmitted from the OFDM demodulator 1220.

Specifically, the MIMO decoder 1230 is an element corresponding to the MIMO precoder 110 of the transmitter 100 and performs an operation corresponding to the MIMO precoder 110.

That is, the MIMO decoder 1230 may perform MIMO decoding with respect to the first reception signal $y_1(k)$ and the second reception signal $y_2(k)$ received from the OFDM demodulator 1220 based on a channel H and a precoding matrix P.

Herein, the precoding matrix P is a matrix which is used when the transmitter 100 performs MIMO precoding, and for example, may be a 2×2 complex matrix used in Equations 1 to 8 when the MIMO precoding is performed. The precoding matrix P may be expressed as Equation 9 presented below:

$$P = \begin{bmatrix} p_{11} & p_{12} \\ p_{21} & p_{22} \end{bmatrix}, \quad (9)$$

For example, when the transmitter 100 performs the MIMO precoding in the method described in Equation 8, the precoding matrix P may be expressed as $p_{11}=\sqrt{\gamma}\times\cos\psi$, $p_{12}=e^{j\theta(k)}\times\sqrt{1-\gamma}\times\sin\psi$, $p_{21}=e^{j\phi(k)}\times\sqrt{\gamma}\times\sin\psi$, and $p_{22}=-e^{j\phi(k)}\times e^{j\theta(k)}\times\sqrt{1-\gamma}\times\cos\psi$.

Information on the precoding matrix used in the MIMO precoding in the transmitter 100 may be pre-stored in the receiver 1200 or the receiver 1200 may receive the information from the transmitter 100.

In addition, the channel H is a 2×2 complex matrix which is formed by the two transmission antennas 151 and 152 and the two reception antennas 1211 and 1212 and may be expressed as Equation 10 presented below:

$$H = \begin{bmatrix} h_{11} & h_{12} \\ h_{21} & h_{22} \end{bmatrix}, \quad (10)$$

where $h_{11}$ is a channel value between the first reception antenna 1211 and the first transmission antenna 151, $h_{12}$ is a channel value between the first reception antenna 1211 and the second transmission antenna 152, $h_{21}$ is a channel value between the second reception antenna 1212 and the first transmission antenna 151, and $h_{22}$ is a channel value between the second reception antenna 1212 and the second transmission antenna 152. These channel values may be obtained by channel estimation using a pilot signal.

The first reception signal $y_1(k)$ and the second reception signal $y_2(k)$ may be expressed as a linear system including an Additive White Gaussian Noise (AWGN) $n_1$ of the first reception antenna 1211 and an AWGN $n_2$ of the second reception antenna 1212 as expressed by Equation 11 presented below:

$$\begin{bmatrix} y_1(k) \\ y_2(k) \end{bmatrix} = \begin{bmatrix} h_{11} & h_{12} \\ h_{21} & h_{22} \end{bmatrix} \begin{bmatrix} p_{11} & p_{12} \\ p_{21} & p_{22} \end{bmatrix} \begin{bmatrix} c_1(k) \\ c_2(k) \end{bmatrix} + \begin{bmatrix} n_1 \\ n_2 \end{bmatrix}, \quad (11)$$

where $c_1(k)$ is a first input signal of the MIMO precoder 110 and $c_2(k)$ is a second input signal of the MIMO precoder 110.

Accordingly, the MIMO decoder 1230 generates an estimation value $\hat{c}_1(k)$ for the first input signal $c_1(k)$ and an estimation value $\hat{c}_2(k)$ for the second input signal $c_2(k)$ by performing MIMO decoding based on Equation 12 presented below, and may output generated $\hat{c}_1(k)$ and $\hat{c}_2(k)$ to the multiplexer 1240:

$$(\hat{c}_1(k), \hat{c}_2(k)) = \quad (12)$$

$$\mathrm{argmin}_{c_1(k), c_2(k)} \left\| \begin{bmatrix} y_1(k) \\ y_2(k) \end{bmatrix} = \begin{bmatrix} h_{11} & h_{12} \\ h_{21} & h_{22} \end{bmatrix} \begin{bmatrix} p_{11} & p_{12} \\ p_{21} & p_{22} \end{bmatrix} \begin{bmatrix} c_1(k) \\ c_2(k) \end{bmatrix} \right\|^2,$$

where $\hat{c}_1(k)$ and $\hat{c}_2(k)$ are QAM symbols.

The multiplexer (or parallel-to-serial converter) 1240 multiplexes the input symbols and outputs the symbols to the QAM demodulator 1250.

Specifically, the multiplexer 1240 is an element corresponding to the demultiplexer 140 of the transmitter 100 and performs an operation corresponding to the demultiplexer 140.

That is, the multiplexer 1240 applies a demultiplexing rule used in the demultiplexer 140 inversely, and multiplexes the input QAM symbols and outputs the QAM symbols in a single stream form. To achieve this, the receiver 1200 may pre-store information on the demultiplexing rule used in the demultiplexer 140 or may receive the information from the transmitter 100.

The QAM demodulator 1250 performs QAM demodulation with respect to the symbols output from the multiplexer 1240.

Specifically, the QAM demodulator 1250 is an element corresponding to the QAM modulator 130 and performs an operation corresponding to the QAM modulator 130.

That is, the QAM demodulator 1250 performs QAM demodulation with respect to the QAM symbols input in the modulation method used in the QAM modulator 130, thereby generating bits transmitted from the transmitter 100. To achieve this, the receiver 1200 may pre-store information on the modulation method used in the QAM modulator 130 (that is, information on in which modulation method the bits are modulated into QAM symbols from among 4-QAM, 16-QAM (or 16-NUC), 64-QAM (or 64-NUC), 256-QAM (or 256-NUC), 1024-QAM (or 1024-NUC), 4096-QAM (or 4096-NUC), etc., or information on which method of the uniform constellation method and the non-uniform constellation method is used for modulation), or may receive the information from the transmitter 100.

A non-transitory computer readable medium, which stores a program for performing the transmitting method according to various exemplary embodiments, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

Components, elements or units represented by a block as illustrated in FIGS. 1-10 and 12 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like Although a bus is not illustrated in the block diagrams of the transmitter and the receiver, communication may be performed between each element of the transmitter and the receiver via the bus. In addition, each apparatus may further include a processor such as a CPU or a microprocessor to perform the above-described various operations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A transmitter comprising:
a Multiple Input Multiple Output (MIMO) precoder configured to, in response to a first input signal and a second input signal, generate a first transmission signal and a second transmission signal, by performing MIMO precoding by pre-phase shifting or pre-phase shifting/hopping the second input signal, and superposition encoding the first input signal and the pre-phase shifted or pre-phase shifted/hopped second input signal; and an OFDM modulator configured to OFDM modulate the first transmission signal and the second transmission signal, wherein the MIMO precoder performs the MIMO precoding by using one of following four equations:

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift matrix, $$\begin{bmatrix} \cos\psi & \sin\psi \\ \sin\psi & -\cos\psi \end{bmatrix}$$

is a superposition encoding matrix, $\theta$ is a pre-phase shift parameter, and w is a superposition encoding parameter;

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $\theta(k)$ is a pre-phase shift/hopping parameter for a $k^{th}$ symbol, and $\psi$ is a superposition encoding parameter;

$$\begin{bmatrix} x_1(k) \\ x_2(k) \end{bmatrix} = \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift matrix, $$\begin{bmatrix} \cos\psi(k) & \sin\psi(k) \\ \sin\psi(k) & -\cos\psi(k) \end{bmatrix}$$

is a superposition encoding matrix, $\theta$ is a pre-phase shift parameter, and $\psi(k)$ is a superposition encoding parameter for a $k^{th}$ symbol; and $$\begin{bmatrix} x_1(k) \\ x_2(k) \end{bmatrix} = \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi(k) & \sin\psi(k) \\ \sin\psi(k) & -\cos\psi(k) \end{bmatrix}$$

is a superposition encoding matrix, $\theta(k)$ is a pre-phase shift/hopping parameter for a $k^{th}$ symbol, and $\psi(k)$ is a superposition encoding parameter for a $k^{th}$ symbol.

2. The transmitter of claim 1, wherein the MIMO precoder performs the MIMO precoding by additionally post-phase shifting or post-phase hopping after superposition encoding the first input signal and the pre-phase shifted or pre-phase shifted/hopped second input signal.

3. The transmitter of claim 2, wherein the MIMO precoder performs the MIMO precoding by using a following Equation:

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi} \end{bmatrix}$$

is a post-phase shift matrix, $\theta(k)$ is a pre-phase shift/hopping parameter for a $k^{th}$ symbol, $\psi$ is a superposition encoding parameter, and $\phi$ is a post-phase shift parameter.

4. The transmitter of claim 2, wherein the MIMO precoder performs the MIMO precoding by using a following Equation:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi(k)} \end{bmatrix}$$

is a post-phase hopping matrix, $\theta(k)$ is a pre-phase shift/hopping parameter for a $k^{th}$ symbol, $\psi$ is a superposition encoding parameter, and $\phi(k)$ is a post-phase hopping parameter for a $k^{th}$ symbol.

5. The transmitter of claim 2, wherein the MIMO precoder performs the MIMO precoding by using a following Equation:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi(k) & \sin\psi(k) \\ \sin\psi(k) & -\cos\psi(k) \end{bmatrix}$$

is a superposition encoding matrix, $$\begin{bmatrix} 1 & 0 \\ 0 & e^{j\phi(k)} \end{bmatrix}$$

is a post-phase hopping matrix, $\theta(k)$ is a pre-phase shift/hopping parameter for a $k^{th}$ symbol, $\psi(k)$ is a superposition encoding parameter for a $k^{th}$ symbol, and $\phi(k)$ is a post-phase hopping parameter for a $k^{th}$ symbol.

6. The transmitter of claim 2, wherein the MIMO precoder performs the MIMO precoding by allocating different power to the first input signal and the second input signal prior to pre-phase shifting or pre-phase shifting/hopping the second input signal.

7. The transmitter of claim 6, wherein the MIMO precoder performs the MIMO precoding by using a following Equation:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} \sqrt{\gamma} & 0 \\ 0 & \sqrt{1-\gamma} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} \sqrt{\gamma} & 0 \\ 0 & \sqrt{1-\gamma} \end{bmatrix}$$

is a power allocation matrix, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi(k)} \end{bmatrix}$$

is a post-phase hopping matrix, γ is a power allocation parameter, θ(k) is a pre-phase shift/hopping parameter for a $k^{th}$ symbol, ψ is a superposition encoding parameter, and ϕ(k) is a post-phase hopping parameter for a $k^{th}$ symbol.

8. The transmitter of claim 1, wherein the MIMO precoding is performed on the first and second input signals on a symbol basis, and
wherein at least one of the pre-phase shifting or pre-phase shifting/hopping and the superposition encoding is performed according to a symbol index of the second input signal.

9. The transmitter of claim 1, wherein the MIMO precoder comprises a power allocator configured to allocate power to the first input signal and the second input signal according to a power allocation parameter which varies based on a modulation method applied to the first input signal and the second input signal.

10. The transmitter of claim 1, further comprising a demultiplexer configured to demultiplex modulated symbols as the first input signal and the second input signal according to an input order of the modulated symbols to the demultiplexer, a modulation method, or a constellation method.

11. A method for transmitting of a transmitter, the method comprising:
in response to a first input signal and a second input signal, generating a first transmission signal and a second transmission signal, by performing Multiple Input Multiple Output (MIMO) precoding by pre-phase shifting or pre-phase shifting/hopping the second input signal and superposition encoding the first input signal and the pre-phase shifted or pre-phase shifted/hopped second input signal; and
OFDM modulating the first transmission signal and the second transmission signal,
wherein the generating comprises performing the MIMO precoding by using one of following four equations:

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift matrix, $$\begin{bmatrix} \cos\psi & \sin\psi \\ \sin\psi & -\cos\psi \end{bmatrix}$$

is a superposition encoding matrix, θ is a pre-phase shift parameter, and ψ is a superposition encoding parameter;

$$\begin{bmatrix} x_1(k) \\ x_2(k) \end{bmatrix} = \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, θ(k) is a pre-phase shift/hopping parameter for a $k^{th}$ symbol, and ψ is a superposition encoding parameter;

$$\begin{bmatrix} x_1(k) \\ x_2(k) \end{bmatrix} = \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta} \end{bmatrix}$$

is a pre-phase shift matrix, $$\begin{bmatrix} \cos\psi(k) & \sin\psi(k) \\ \sin\psi(k) & -\cos\psi(k) \end{bmatrix}$$

is a superposition encoding matrix, θ is a pre-phase shift parameter, and ψ(k) is a superposition encoding parameter for a $k^{th}$ symbol; and $$\begin{bmatrix} x_1(k) \\ x_2(k) \end{bmatrix} = \begin{bmatrix} \cos\psi(k) & \sin\psi(k) \\ \sin\psi(k) & -\cos\psi(k) \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi(k) & \sin\psi(k) \\ \sin\psi(k) & -\cos\psi(k) \end{bmatrix}$$

is a superposition encoding matrix, θ(k) is a pre-phase shift/hopping parameter for a $k^{th}$ symbol, and ψ(k) is a superposition encoding parameter for a $k^{th}$ symbol.

12. The method of claim 11, wherein the generating comprises performing the MIMO precoding by additionally post-phase shifting or post-phase hopping after superposition encoding the first input signal and the pre-phase shifted or pre-phase shifted/hopped second input signal.

13. The method of claim 12, wherein the generating comprises performing the MIMO precoding by using a following Equation:

$$\begin{bmatrix} x_1(k) \\ x_2(k) \end{bmatrix} = \begin{bmatrix} 1 & 0 \\ 0 & e^{j\phi} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi} \end{bmatrix}$$

is a post-phase shift matrix, θ(k) is a pre-phase shift/hopping parameter for a $k^{th}$ symbol, ψ is a superposition encoding parameter, and φ is a post-phase shift parameter.

14. The method of claim 12, wherein the generating comprises performing the MIMO precoding by using a following Equation:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\phi(k)} \end{bmatrix}$$

is a post-phase hopping matrix, θ(k) is a pre-phase shift/hopping parameter for a $k^{th}$ symbol, ψ is a superposition encoding parameter, and φ(k) is a post-phase hopping parameter for a $k^{th}$ symbol.

15. The method of claim 12, wherein the generating comprises performing the MIMO precoding by using a following Equation:

$$\begin{bmatrix} x_1(k) \\ x_2(k) \end{bmatrix} = \begin{bmatrix} 1 & 0 \\ 0 & e^{j\phi(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\theta(k)} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} 1 & 0 \\ 0 & e^{j\theta(k)} \end{bmatrix}$$

is a pre-phase shift/hopping matrix, $$\begin{bmatrix} \cos\psi(k) & \sin\psi(k) \\ \sin\psi(k) & -\cos\psi(k) \end{bmatrix}$$

is a superposition encoding matrix, $$\begin{bmatrix} 1 & 0 \\ 0 & e^{j\phi(k)} \end{bmatrix}$$

is a post-phase hopping matrix, θ(k) is a pre-phase shift/hopping parameter for a $k^{th}$ symbol, ψ(k) is a superposition encoding parameter for a $k^{th}$ symbol, and φ(k) is a post-phase hopping parameter for a $k^{th}$ symbol.

16. The method of claim 12, wherein the generating comprises performing the MIMO precoding by allocating different power to the first input signal and the second input signal prior to pre-phase shifting or pre-phase shifting/hopping the second input signal.

17. The method of claim 16, wherein the generating comprises performing the MIMO precoding by using a following Equation:

$$\begin{bmatrix} x_1(k) \\ x_2(k) \end{bmatrix} = \begin{bmatrix} 1 & 0 \\ 0 & e^{j\theta(k)} \end{bmatrix} \begin{bmatrix} \cos\psi & \sin\psi \\ \sin\psi & -\cos\psi \end{bmatrix} \begin{bmatrix} 1 & 0 \\ 0 & e^{j\phi(k)} \end{bmatrix} \begin{bmatrix} \sqrt{\gamma} & 0 \\ 0 & \sqrt{1-\gamma} \end{bmatrix} \begin{bmatrix} c_1(k) \\ c_2(k) \end{bmatrix},$$

where $c_1(k)$ is a $k^{th}$ symbol of the first input signal, $c_2(k)$ is a $k^{th}$ symbol of the second input signal, $x_1(k)$ is a $k^{th}$ symbol of the first transmission signal, $x_2(k)$ is a $k^{th}$ symbol of the second transmission signal, $$\begin{bmatrix} \sqrt{\gamma} & 0 \\ 0 & \sqrt{1-\gamma} \end{bmatrix}$$

is a power allocation matrix, $$\begin{bmatrix} 1 & 0 \\ 0 & e^{j\phi(k)} \end{bmatrix}$$

is a pre-phase shift/hopping matrix, $$\begin{bmatrix} \cos\psi & \sin\psi \\ \sin\psi & -\cos\psi \end{bmatrix}$$

is a superposition encoding matrix, $$\begin{bmatrix} 1 & 0 \\ 0 & e^{j\theta(k)} \end{bmatrix}$$

is a post-phase hopping matrix, $\gamma$ is a power allocation parameter, $\theta(k)$ is a pre-phase shift/hopping parameter for a $k^{th}$ symbol, $\gamma$ is a superposition encoding parameter, and $\phi(k)$ is a post-phase hopping parameter for a $k^{th}$ symbol.

18. The method of claim 11, wherein the MIMO precoding is performed on the first and second input signals on a symbol basis, and wherein at least one of the pre-phase shifting or pre-phase shifting/hopping and the superposition encoding is performed according to a symbol index of the second input signal.

19. The method of claim 11, wherein the MIMO precoding comprises allocating power to the first input signal and the second input signal according to a power allocation parameter which varies based on a modulation method applied to the first input signal and the second input signal.

20. The method of claim 11, further comprising demultiplexing modulated symbols as the first input signal and the second input signal according to an input order of the modulated symbols to the demultiplexer, a modulation method, or a constellation method.

* * * * *